(12) United States Patent
Ohtsubo et al.

(10) Patent No.: US 7,946,641 B2
(45) Date of Patent: May 24, 2011

(54) DRIVER-SIDE FLOOR STRUCTURE OF VEHICLE

(75) Inventors: Tomonori Ohtsubo, Hiroshima (JP);
Hiroki Uemura, Hiroshima (JP);
Yusaku Takeda, Aki-gun (JP); Asami Iwamoto, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 148 days.

(21) Appl. No.: 12/379,875

(22) Filed: Mar. 3, 2009

(65) Prior Publication Data
US 2009/0230730 A1    Sep. 17, 2009

(30) Foreign Application Priority Data

Mar. 4, 2008 (JP) .................... 2008-053870
Mar. 4, 2008 (JP) .................... 2008-053871
Mar. 4, 2008 (JP) .................... 2008-053872

(51) Int. Cl.
*B60N 3/06* (2006.01)
(52) U.S. Cl. ................ 296/75; 296/193.07; 74/564
(58) Field of Classification Search ............. 296/193.07, 296/75; 74/564
See application file for complete search history.

(56) References Cited

U.S. PATENT DOCUMENTS

| | | | | |
|---|---|---|---|---|
| 4,991,900 A | * | 2/1991 | White | 296/75 |
| 6,102,466 A | * | 8/2000 | Kanazawa et al. | 296/75 |
| 6,131,485 A | * | 10/2000 | Raja | 296/75 |
| 6,283,529 B2 | * | 9/2001 | Kitagawa | 296/75 |
| 6,312,039 B1 | * | 11/2001 | Bartz | 296/75 |
| 6,761,389 B2 | * | 7/2004 | Akasaka et al. | 296/75 |
| 7,419,029 B2 | | 9/2008 | Ohtsubo et al. | |
| 2007/0176456 A1 | * | 8/2007 | Ohtsubo et al. | 296/75 |

FOREIGN PATENT DOCUMENTS

| | | |
|---|---|---|
| EP | 0 410 939 A1 | 1/1991 |
| EP | 1 488 964 A1 | 12/2004 |
| FR | 2 631 292 | 11/1989 |
| JP | 4-129885 | 4/1992 |
| JP | 2005-14505 | 6/2005 |
| JP | 2005-145405 | 6/2005 |
| JP | 2007-109162 | 4/2007 |

OTHER PUBLICATIONS

European Search Report issued May 25, 2009 in corresponding European Patent Application 09154290.2.

* cited by examiner

*Primary Examiner* — Lori L Lyjak

(57) ABSTRACT

A floor structure on a driver side of a vehicle where a control pedal, such as a brake pedal, adapted to be depressedly operated by a driver seated in a driver seat arranged at a front of a passenger compartment. The floor structure has a heel-placement zone which is provided on an approximately horizontal floor portion located rearward of a depressing point of the control pedal, and formed to have a frontward region adapted to allow a short person seated in the driver seat place his/her heel thereon and a rearward region adapted to allow a tall person seated in the driver seat place his/her heel thereon. The heel-placement zone includes an inclined surface portion formed in at least part thereof in such a manner as to rise relative to a surrounding area of the floor portion and has an upper surface extending obliquely upwardly and frontwardly. The floor structure can adjust a driving posture easily and adequately with a simple structure to allow a driver seated in the driver seat to adequately operate the control pedal.

15 Claims, 20 Drawing Sheets

DRIVER-SIDE FLOOR STRUCTURE OF VEHICLE

CROSS REFERENCE TO RELATED APPLICATION

This application claims the benefit of Japanese Application No(s). 2008-53870, 2008-53871, and 2008-53872, filed Mar. 4, 2008, in the Japanese Patent Office, the disclosures of which are incorporated herein by reference.

BACKGROUND OF THE INVENTION

1. Field of the Invention

The present invention relates to a floor structure on a driver side of a vehicle where a control pedal adapted to be depressedly operated by a driver seated in a driver seat is arranged at a front of a passenger compartment.

2. Description of the Background Art

Heretofore, there has been known a driving posture adjusting system for a vehicle, which comprises seat-position adjusting means adapted to adjust a position of a seating surface of a seat, floor-panel position adjusting means adapted to adjust a vertical position of a floor panel (movable floor) for allowing a passenger who intends to operate a pedal to place his/her foot thereon, and manually-operated driving-posture adjusting means adapted to allow the passenger to manually operate the two means, whereby both needs for setting an adequate driving posture and ensuring forward visibility can be satisfied, irrespective of a difference in passenger's body size, while allowing the adequate driving posture to be obtained even if an adjustable distance of the seat in a frontward-rearward (i.e., longitudinal) direction of the vehicle is relatively small, and a height position of the floor can be adjusted to ensure adequate pedal operability, as disclosed, for example, in JP 2005-145405A (hereinafter referred to as Patent Document 1).

There has also been known an operation assist device for a foot-operated pedal, which comprises a pedal base mounted on a floor surface of a passenger compartment of a vehicle to allow a heel of an operating-foot to be placed thereon, wherein the pedal base has a depressing-operation supportive shape portion formed to keep the heel of the operating-foot in a supported state in the entire movable range of the foot-operated pedal, so as to prevent the heel of the operating-foot from being uplifted relative to the pedal base, to allow a pedal-depressing operation to be stably performed, as disclosed in JP 2007-109162A (hereinafter referred to as Patent Document 2).

In the driving posture adjusting system disclosed in the Patent Document 1, the driver seat can be moved in the longitudinal direction by the seat-position adjusting means, depending on a body height of a driver to be seated in the driver seat, and correspondingly a vertical position and an inclination angle of a seat cushion can be adjusted. This makes it possible to adequately depress a control pedal, such as an accelerator pedal or a brake pedal, arranged in front of the driver seat, while keeping a seated posture of a driver seated in the driver seat, comfortable, and adjust the driver's seated posture to adequately ensure forward visibility. In addition, when a driver seated in the driver seat is changed to another person having a different body height, and thereby body sizes, such as a leg length and a sole size, are changed, a vertical position of the movable floor can be adjusted by the floor-panel position adjusting means, depending on the change in body sizes. This provides an advantage of being able to adjust a control-pedal depressing characteristic to allow a ball region of a sole of a driver to be adequately brought into contact with a pedal surface of the control pedal under a condition that a heel of the driver is placed on the floor panel.

However, in the driving posture adjusting system comprising the seat-position adjusting means adapted to adjust a longitudinal position of a driver seat and a vertical position and an inclination angle of a seat cushion, and the floor-panel position adjusting means adapted to adjust a vertical position of a movable floor, there are problems, such as structural complexity in required adjusting devices, and high production cost. In particular, it is necessary to install the floor-panel position adjusting means in a narrow space defined between the movable floor and a floor panel located beneath the movable floor. This involves a problem, such as difficulty in sufficiently ensuring the installation space. Moreover, even if the vertical position of the movable floor is adjusted to a desired position, pedal operability for a driver will be changed under an influence of adjustment of the position and the angle of the driver seat by the seat-position adjusting means. Thus, it is extremely difficult to adjust all the position and the angle of the driver seat and the vertical position of the movable floor to respective desired positions.

In the operation assist device disclosed in the Parent Document 2, the depressing-operation supportive shape portion formed on an upper surface of the pedal base attached to a lower portion of the foot-operated pedal is configured to have a first sole-placement surface extending obliquely downwardly in a rearward direction of the vehicle, and a second sole-placement surface with an inclination angle relative to a floor surface, greater than that that of the first sole-placement surface, and a breadth in a longitudinal direction of the vehicle, less than that of the first sole-placement surface. In this case, during a depressing operation of the foot-operated pedal, a catching portion made up of the first sole-placement surface and the second sole-placement surface can prevent a heel of an operator from being displaced in a frontward direction of the vehicle. This provides an advantage of being able to effectively stabilize operability of the foot-operated pedal.

In this operation assist device, when a driver seated in a driver seat is changed to another person having a different body height, and thereby a seated position and a seated posture are changed, it is also desirable to adjust a height position of the catching portion for placing a heel thereon. However, this point is not considered in the Patent Document 2 at all, and the operability of the foot-operated pedal is likely to become worse due to the presence of the pedal base.

SUMMARY OF THE INVENTION

In view of the above circumstances, it is an object of the present invention to provide a vehicle driver-side floor structure capable of adjusting a driving posture easily and adequately with a simple structure to allow a driver seated in a driver seat to adequately operate a control pedal.

According to a one aspect of the present invention, there is provided a floor structure on a driver side of a vehicle where a control pedal adapted to be depressedly operated by a driver seated in a driver seat is arranged at a front of a passenger compartment. The floor structure comprises a heel-placement zone which is provided on an approximately horizontal floor portion located rearward of a depressing point of the control pedal, and formed to have the heel-placement zone has a frontward region adapted to allow a short person seated in the driver seat to place his/her heel thereon and a rearward region adapted to allow a tall person seated in the driver seat to place his/her heel thereon, wherein the heel-placement zone includes an inclined surface portion formed in at least a part thereof in such a manner as to rise relative to a surrounding area of the floor portion and have an upper surface extending obliquely upwardly and frontwardly.

In the aforementioned floor structure, the inclined surface portion is formed in at least a part of the heel-placement zone in such a manner as to rise relative to a surrounding area of the floor portion and have an upper surface extending obliquely upwardly and frontwardly. Thus, when the need arises, a driver seated in the diver seat can place his/her heel on the inclined surface portion and adjust a position of the heel to be placed on the inclined surface portion (heel-placement position) to allow a ball region of the driver to be brought into contact with the depressing point of the control pedal, while keeping each of an angle of an ankle region and an inclination angle of a sole of the driver, at an adequate value. This provides an advantage of being able to prevent the occurrence of difficulty in delicately perform a pedal-depressing operation, due to a situation where a heel of an operating-foot of the driver is spaced apart from a floor surface during the pedal-depressing operation, and further prevent the occurrence of difficulty in quickly operating the control pedal due to a situation where the angle of the ankle region or the inclination angle of the sole is largely deviated from the adequate value.

These and other objects, features and advantages of the present invention will become apparent upon reading of the following detailed description along with the accompanied drawings.

DESCRIPTION OF THE PREFERRED EMBODIMENTS

Figure 1:
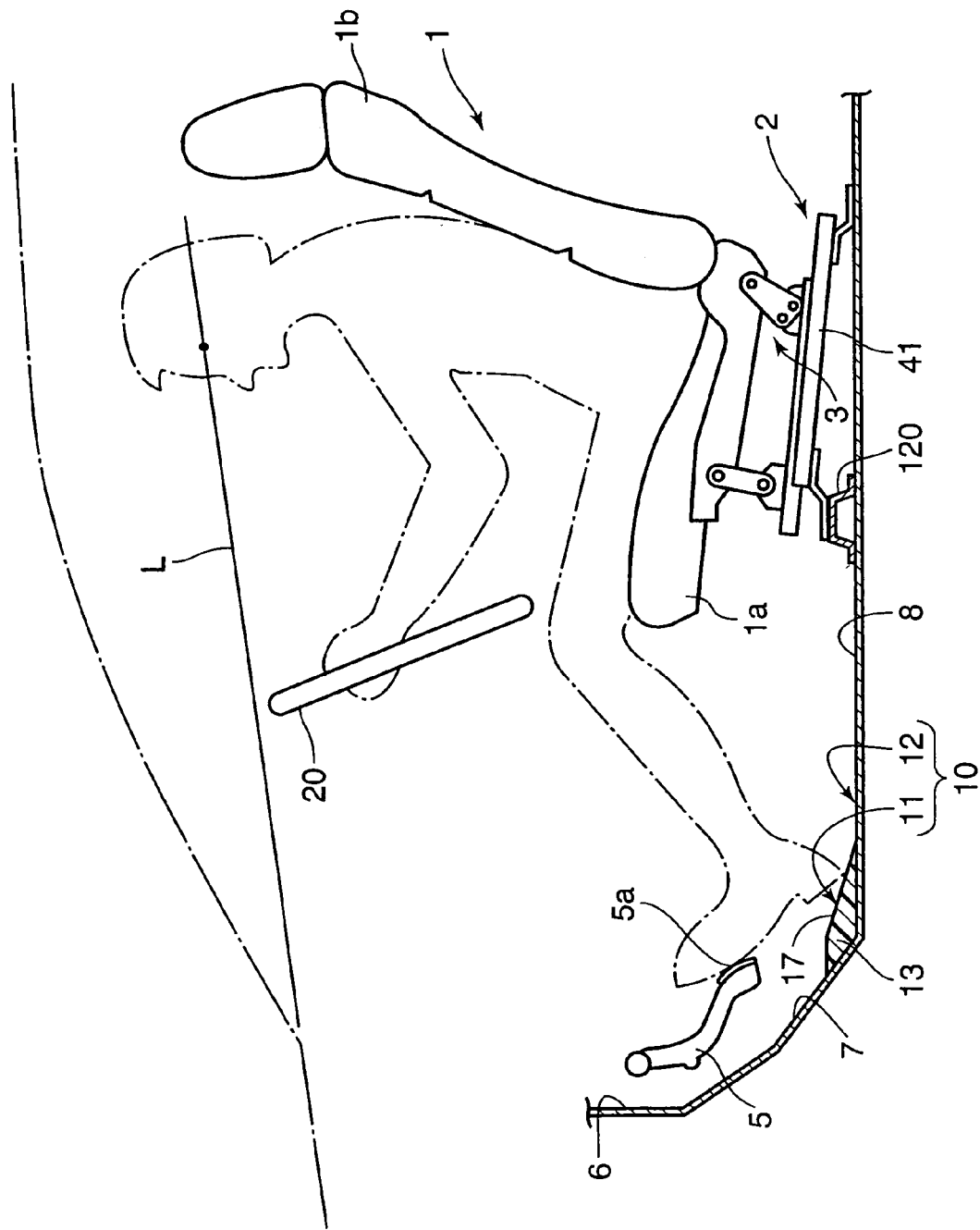
FIG. 1 is an explanatory diagram showing a vehicle driver-side floor structure according to a first embodiment of the present invention.

FIGS. 1 to 5 show a floor structure on a driver side of a vehicle, according to a first embodiment of the present invention. This vehicle is equipped with a seat adjustment mechanism which includes a longitudinal-position adjustment mechanism 2 adapted to slidingly displace a seat cushion 1a of a driver seat 1 arranged inside a passenger compartment thereof to adjust a position of the driver seat 1 in a frontward-rearward (i.e., longitudinal) direction of a vehicle body (or vehicle), and a tilt-angle adjustment mechanism 3 adapted to adjust a tilt angle of the seat cushion 1a. Further, two control pedals consisting of a brake pedal 4 and an accelerator pedal 5 each adapted to be depressedly operated by a driver seated in the driver seat 1 are arranged side-by-side in a rightward-leftward (i.e., widthwise or lateral) direction of the vehicle body.

The vehicle body comprises a dash panel 6 partitioning between an engine compartment and the passenger compartment, a kick-up portion 7 continuously extending from a rear edge of the dash panel 6 in the rearward direction of the vehicle body, and an approximately flat (horizontal) floor portion 8 continuously extending from a rear edge of the kick-up portion 7 in the rearward direction of the vehicle body. The floor panel 8 has an upper surface provided with a conventional floor trim material (not shown) which comprises an insulator having sound and heat insulation functions, such as felt insulator or glass wool insulator, and a surface layer made of a carpet material or the like and formed to cover an upper surface of the insulator.

The approximately flat floor portion 10 includes a heel-placement zone 10 provided on the approximately flat floor portion 8 located rearward of a depressing point 5a of the accelerator pedal 5 as one of the control pedals, i.e., a position of the accelerator pedal 5 to be depressed by a ball region (a raised region located at a base end of a big toe) of a driver seated in the driver seat 1, and adapted to allow a driver seated in the driver seat 1 to place thereon a heel of his/her foot to be used for a pedal-depressing operation (hereinafter referred to as "operating-foot"). The heel-placement zone 10 comprises a frontward region 11 adapted to allow a short person seated in the driver seat 1 to place a heel of his/her operating-foot, and a rearward region 12 adapted to allow a tall person seated in the driver seat 1 to place a heel of his/her operating-foot.

As used therein, the term "short person" means a person having a body height less than that of an average-height person who may most frequently sit on the driver seat 1 in a statistical viewpoint, and the term "tall person" means a person having a body height greater than that of an average-height person. On the basis of a reference position on which an average-height person seated in the driver seat 1 places a heel of his/her operating-foot, a region frontward of the reference position is set as the frontward region 11 of the heel-placement zone 10, and a region rearward of the reference position is set as the rearward region 12 of the heel-placement zone 10.

Figure 2:
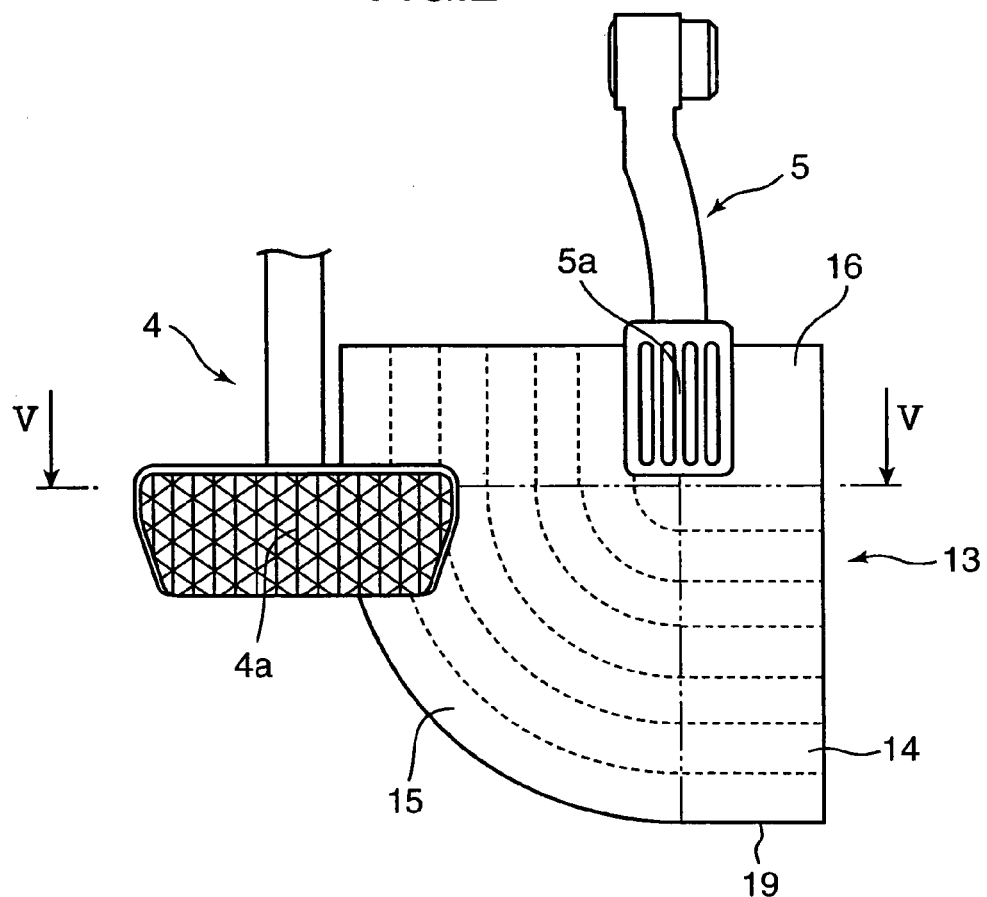
FIG. 2 is a top plan view showing a specific configuration of a pad member.

The frontward region 11 of the heel-placement zone 10 is provided with a pad member 13 made, for example, of a synthetic resin material having appropriate flexibility and stiffness. As shown in FIG. 2, the pad member 13 is formed and arranged to extend from an installation area of the accelerator pedal 5 rightwardly (in a vehicle with a right-hand steering wheel, outwardly, i.e., in a direction toward an outside of the vehicle), in top plan view. The pad member 13 comprises an inclined surface portion 14 having an upper surface extending obliquely upwardly and frontwardly, a sector-shaped portion 15 formed to extend from the installation area of the accelerator pedal 5 leftwardly (i.e., in a direction toward an installation area of the brake pedal 4) and have an upper surface with an arc conical shape about a point in a vertical line extending through a rear portion of the depression point 5a of the accelerator pedal 5, and a front extension portion 16 continuously extending frontwardly from respective front ends of the inclined surface portion 14 and the sector-shaped portion 15.

Figure 3:
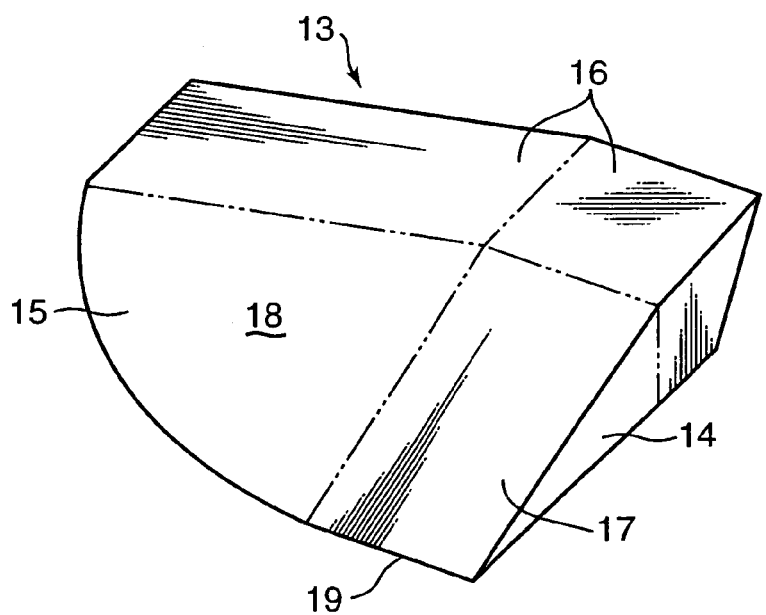
FIG. 3 is a perspective view showing a specific configuration of the pad member.
Figure 4:
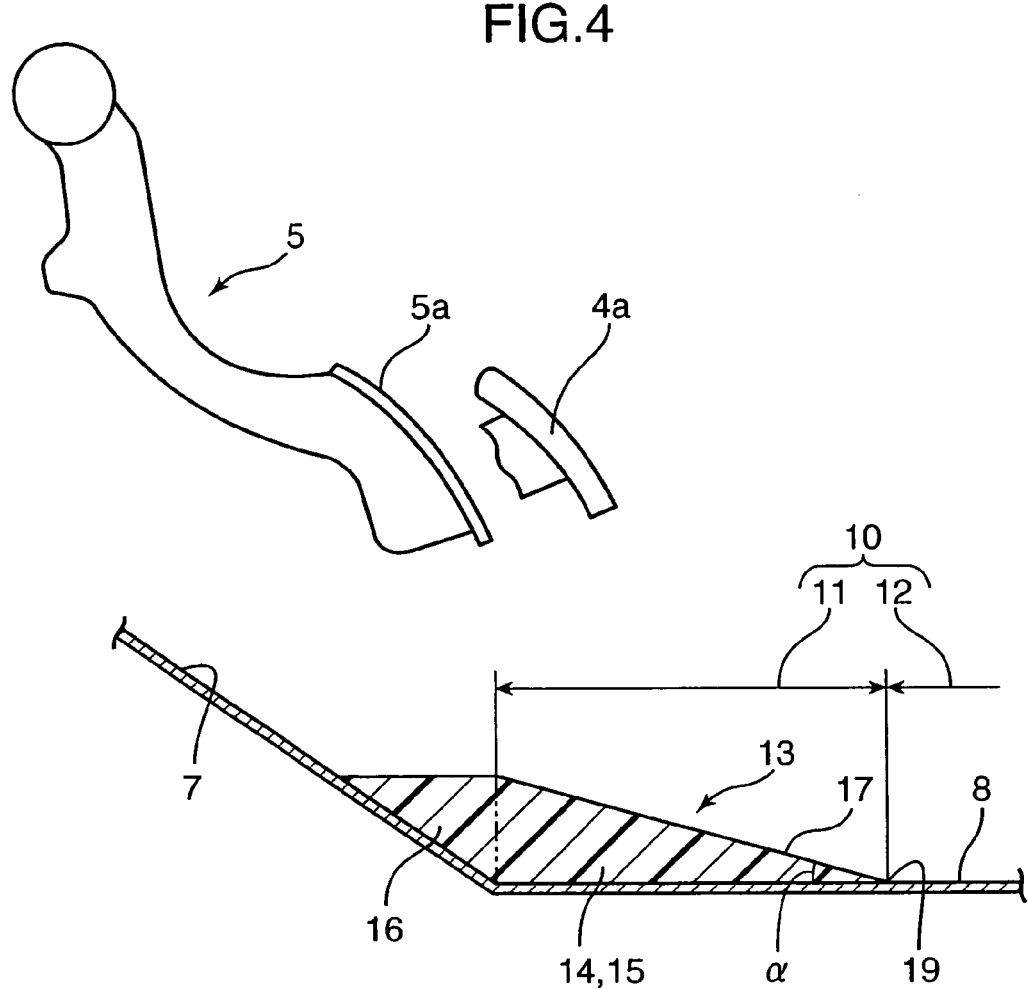
FIG. 4 is a sectional side view showing a specific configuration of the pad member.
Figure 5:
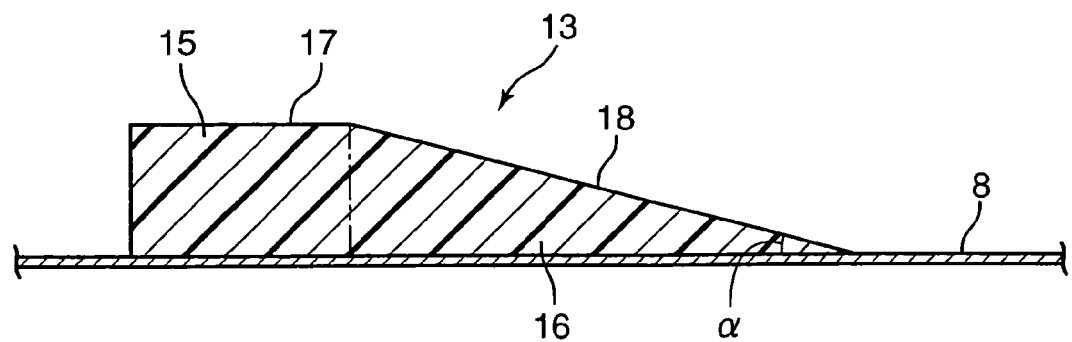
FIG. 5 is a sectional view taken along the line V-V in FIG. 2.

As shown in FIGS. 3 and 4, the inclined surface portion 14 of the pad member 13 is formed in a triangular shape in side view. That is, as shown in FIGS. 2 and 5, the sector-shaped portion 15 of the pad member 13 is formed to have an upper surface with a one-fourth circular conical shape having a top at the depression point 5a of the accelerator pedal 5. The pad member 13 is fixed onto the floor portion 8 through an adhesive or a fastener, in such a manner that the respective upper surfaces 17, 18 of the inclined surface portion 14 and the sector-shaped portion 15 continuously extend in the rightward-leftward direction, and extend obliquely upwardly toward the depressing point 5a of the accelerator pedal 5.

An inclination angle α of an inclined surface consisting of the upper surfaces 17, 18 of the inclined surface portion 14 and the sector-shaped portion 15 is set in the range of 13.5 to 23.5 degrees. Further, as shown in FIGS. 4 and 5, a valley-shaped bent region (downwardly-concaved concave-shaped region) 19 is formed between a rear end of the inclined surface portion 14, and the approximately horizontal surface portion 8 located rearward of and continuous with the rear end, to extend in the lateral direction of the vehicle body. In FIG. 2, the broken lines indicate contour lines. Each of the upper surfaces 17, 18 of the inclined surface portion 14 and the sector-shaped portion 15 is colored with a different color from that of the approximately horizontal surface portion (floor portion 8) located rearward of and continuous with the upper surfaces 17, 18.

Figure 6:
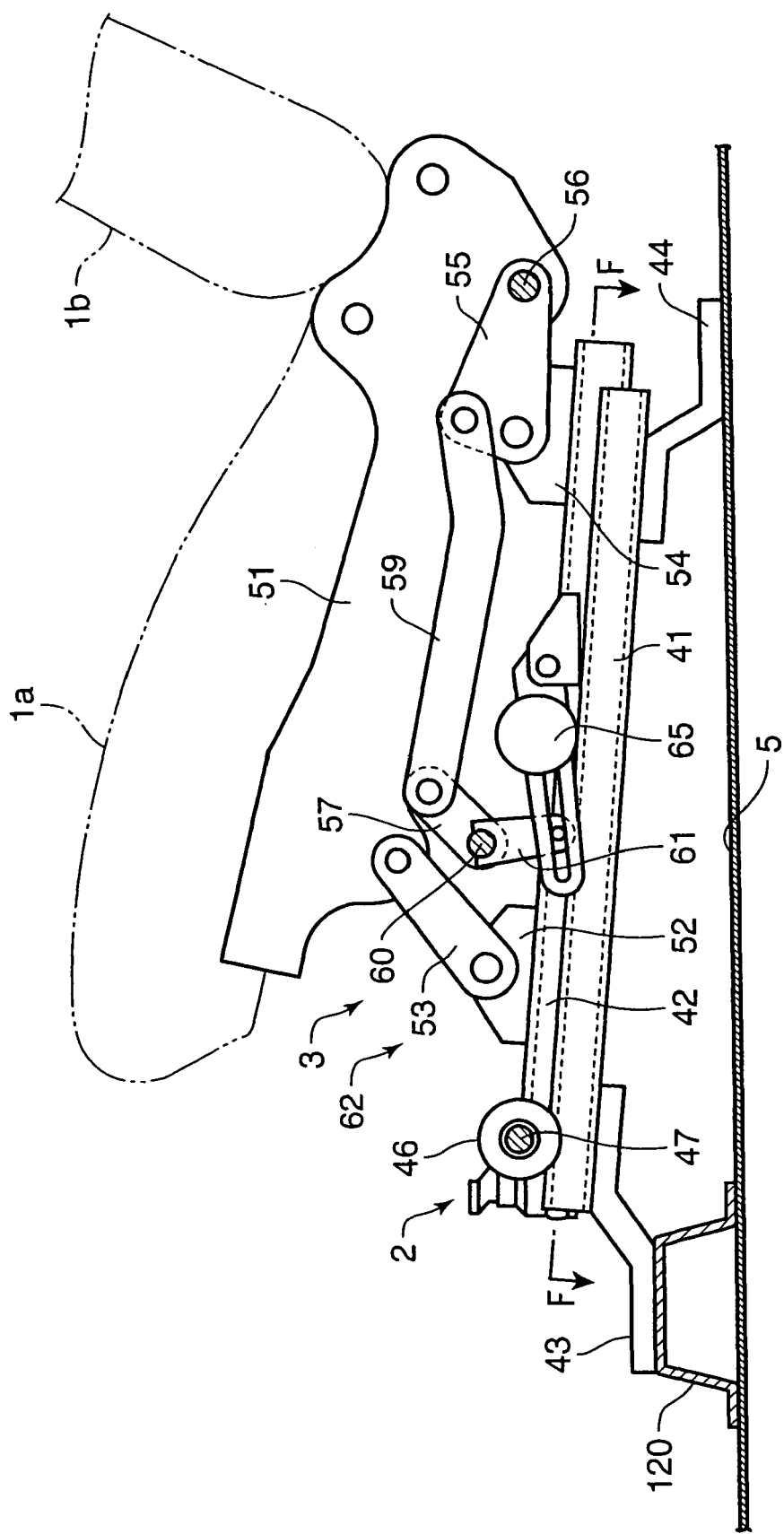
FIG. 6 is a side view showing a specific structure of a seat adjustment mechanism.
Figure 7:
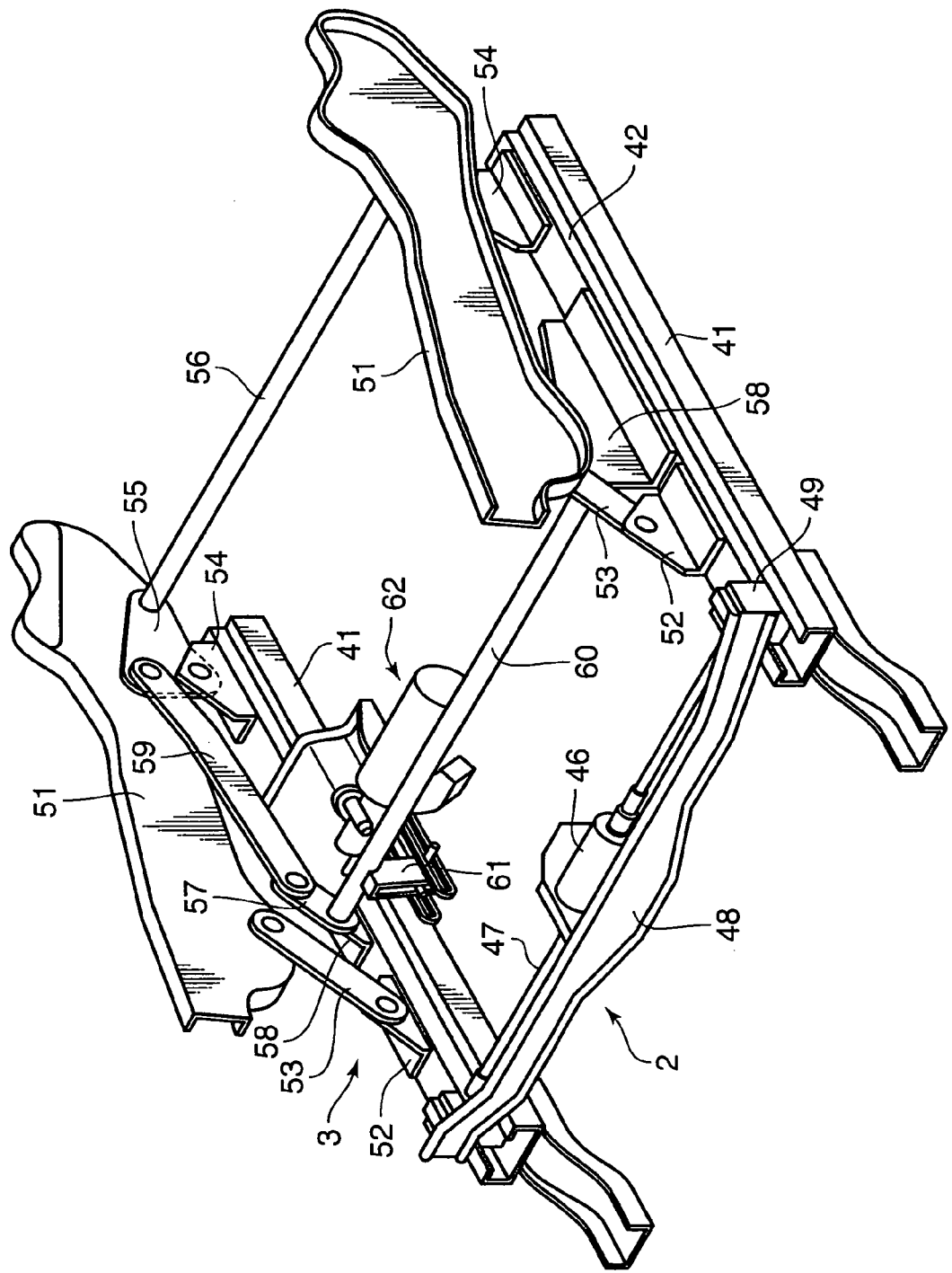
FIG. 7 is a perspective view showing a specific structure of the seat adjustment mechanism.
Figure 8:
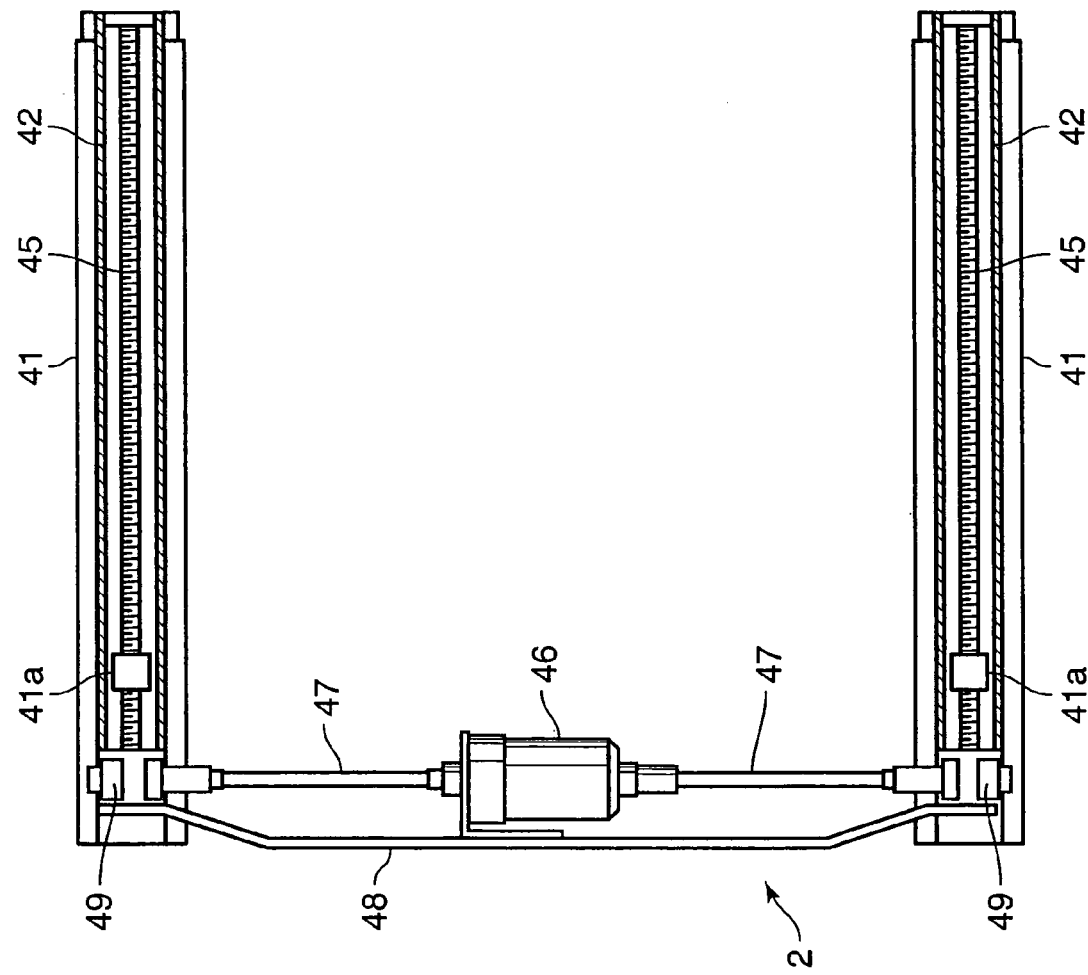
FIG. 8 is a sectional view taken along the line F-F in FIG. 6.

As shown in FIGS. 6 to 8, the floor portion 8 includes an installation zone for the driver seat 1, which is provided with a pair of right and left seat slide lower rails 41 for supporting the seat cushion 1a in a frontwardly-rearwardly movable manner, and a pair of right and left seat slide upper rails 42 supported by respective ones of the right and left seat slide lower rails 41 in such a manner as to be slidably displaceable therealong. Each of the seat slide lower rails 41 is comprised, for example, of a C-shaped steel member having an upper opening, and two brackets 43, 44 are integrally joined to respective front and rear ends of the seat slide lower rail 41 by welding or other fixing means. The brackets 43, 44 are fixed, respectively, to an upper surface of a cross member 120 and the floor portion 8 by fastening bolts or other fastening means, so that each of the seat slide lower rails 41 is installed onto the floor portion 8 in such a manner as to extend slightly obliquely upwardly and frontwardly.

As shown in FIG. 8, a rotary shaft 45 comprised of a screw shaft is rotatably installed within each of the right and left slide lower rails 41. A drive shaft 47 adapted to be drivenly rotated by a drive motor 46, and a support member 48 rotatably supporting the drive shaft 47, are provided to extend laterally between respective front ends of the right and left slide lower rails 41. Further, a driving-force transmission section 49 comprised of a bevel gear mechanism or a worm wheel mechanism is provided at each of right and left ends of the drive shaft 47 to transmit a driving force of the drive shaft 47 to a respective one of the rotary shaft 45.

The longitudinal-position adjustment mechanism 2 adapted to slidably displace the seat cushion 1a of the driver seat 1 along the seat slide lower rails 41 so as to adjust a longitudinal position of the driver seat 1 is made up of the seat slide lower rails 41, the seat slide upper rails 42, the rotary shafts 45, the drive motor 46, the drive shaft 47, the driving-force transmission sections 49, and two nut blocks 41a fixed to respective bottom surfaces of the seat slide lower rails 41 and screwed with the respective rotary shafts 45.

For example, when a longitudinal-position adjusting switch (not shown) is manually operated in a direction for frontward movement, a control signal for rotating the drive motor 46 in a normal direction is output, and the drive motor 46 is rotated in the normal direction in response to the control signal, so that a driving force causing a frontward movement of the seat cushion 1a is transmitted to the drive shaft 47, the driving-force transmission sections 49 and the rotary shafts 45. Thus, the rotary shafts 45 are drivenly rotated by the driving force input from the respective driving-force transmission sections 49, and threadingly moved frontwardly, while being supported by the respective nut blocks 41a each fixed to a respective one of the bottom surfaces of the seat slide lower rails 41, so that the seat cushion 1a of the driver seat 1 is drivenly moved frontwardly together with the seat slide upper rails 42.

When the longitudinal-position adjusting switch is manually operated in a direction for rearward movement, a control signal for rotating the drive motor 46 in a reverse direction is output, and the drive motor 46 is rotated in the reverse direction in response to the control signal, so that a driving force causing a rearward movement of the seat cushion 1a is transmitted to the drive shaft 47, the driving-force transmission sections 49 and the rotary shafts 45. Thus, the rotary shafts 45 are drivenly rotated in a reverse direction, and threadingly moved rearwardly, so that the seat cushion 1a of the driver seat 1 is drivenly moved rearwardly together with the seat slide upper rails 42.

The seat slide lower rails 41 are installed onto the floor portion 8 in such a manner as to extend obliquely upwardly and frontwardly, as mentioned above. Thus, when the seat slide upper rails 42 and the seat cushion 1a of the driver seat 1 are moved frontwardly along the seat slide lower rails 41 by the longitudinal-position adjustment mechanism 2, the seat cushion 1a is pushed upwardly in conjunction with the frontward movement. Reversely, when the seat slide upper rails 42 and the seat cushion 1a of the driver seat 1 are moved rearwardly along the seat slide lower rails 41 by the longitudinal-position adjustment mechanism 2, the seat cushion 1a is lowered in conjunction with the frontward movement.

The seat slide upper rails 42 are also provided with the tilt-angle adjustment mechanism 3 adapted to change a tilt angle of the seat cushion 1a of the driver seat 1. As shown in FIGS. 6 and 7, the tilt-angle adjustment mechanism 3 comprises: a pair of right and left cushion frames 51 provided on respective right and left sides of the seat cushion 1a; a pair of right and left front brackets 52 provided on respective upper surfaces of front portions of the right and left seat slide upper rails 42 to support respective front ends of the right and left cushion frames 51 in cooperation with respective ones of a pair of right and left front links 53; a pair of right and left rear brackets 54 provided on respective upper surfaces of rear portions of the right and left seat slide upper rails 42 to support respective rear ends of the right and left cushion frames 51 in cooperation with respective ones of a pair of right and left triangular-shaped rear links 55; a connection shaft 56 connecting respective rear ends of the right and left rear links 55 together and connecting respective rear lower portions of the right and left cushion frames 51 together; a pair of right and left center brackets 58 provided on respective upper surfaces of central portions of the right and left seat slide upper rails 42 to support respective ones of a pair of right and left central links 57 adapted to transfer a driving force to the respective right and left rear links 55; a pair of right and left connection links connecting upper portions of the right and left central links 57 to respective front ends of the right and left links 55; an after-mentioned drive shaft 60; an after-mentioned drive lever 61; and an after-mentioned tilt drive section 62.

Each of the right and left central links 57 is fixed to a laterally-extending drive shaft 60 through a lower end thereof, and rotatably supported by the respective right and left central brackets 58 through the drive shaft 60. A drive lever 61 is fixed to the drive shaft 60 to rotatably displace the drive shaft 60. A tilt drive section 62 adapted to drivingly move the drive lever 61 fixed to the drive shaft 60 is mounted on the central bracket 58 provided on one (a laterally outward one) of the right and left seat slide upper rails 42.

Figure 9:
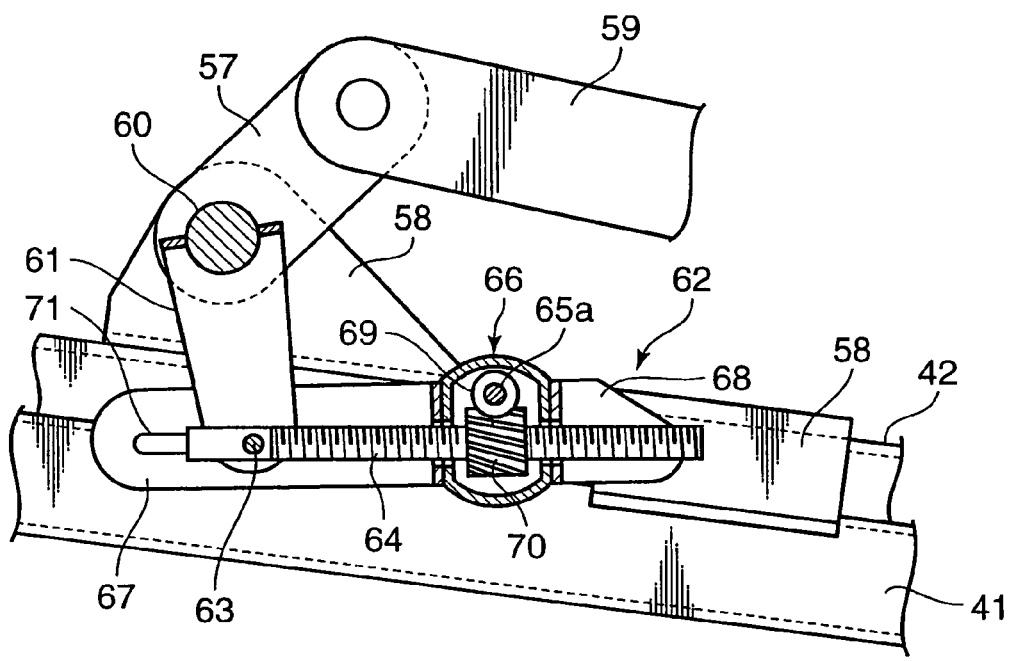
FIG. 9 is a sectional side view showing a specific structure of a tilt-angle adjustment mechanism.
Figure 10:
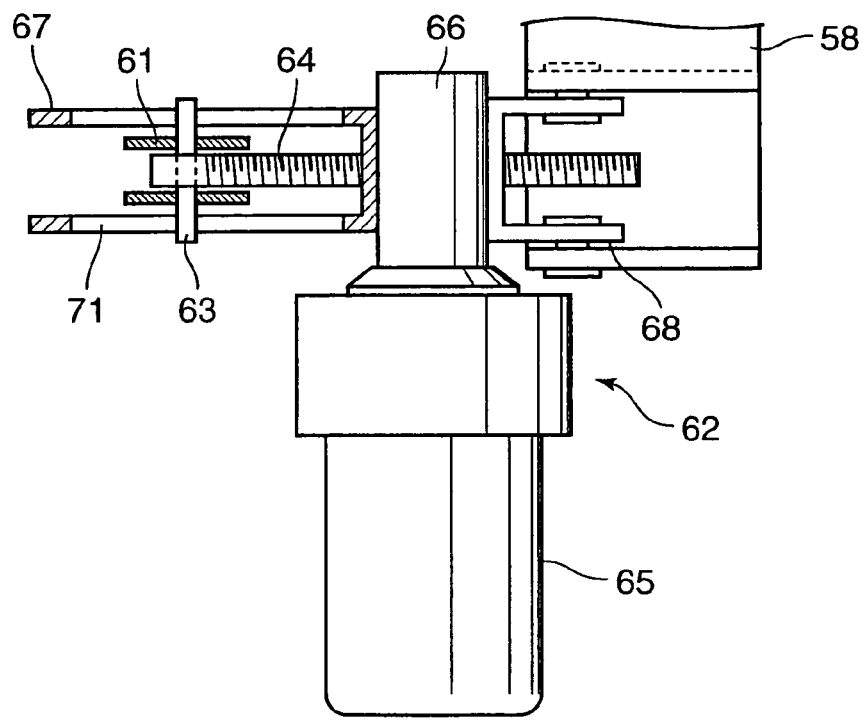
FIG. 10 is a sectional top plan view showing a specific structure of the tilt-angle adjustment mechanism.

As shown in FIGS. 9 and 10, the tilt drive section 62 comprises a screw shaft 64 having a front end connected to a distal (lower) end of the drive lever 61 through a connection pin 63, a combination of a drive motor 65 and a gear mechanism 66 which is adapted to drivingly rotate the screw shaft 64, and a guide bracket 67 fixedly attached to a front surface of the gear mechanism 66, wherein a base end of the guide bracket 67 is supported by the central bracket 58 through a support bracket 68. The gear mechanism 66 is provided with a worm gear 69 fixedly attached to an output shaft 65a of the drive motor 65, and a worm nut 70 adapted to be drivenly rotated by the worm gear 69, wherein the worm gear 70 is formed with a screw hole screwable with the screw shaft 64.

When the worm nut 70 is drivenly rotated by a driving force input from the drive motor 65 thereto through the worm gear 69, the screw shaft 64 screwed with the worm nut 70 is rotated and threadingly moved. Then, as the screw shaft 64 is threadingly moved in this manner, the connection pin 63 provided at the distal end of the screw shaft 64 is moved in the longitudinal direction along a support groove 71 formed in the guide bracket 67, and a driving force of the screw shaft 64 is transmitted to the drive lever 61 through the connection pin 63. Thus, the drive lever 61 is swingingly displaced to drivingly rotate the drive shaft 60.

Then, as the drive shaft 60 is drivenly rotated, the right and left central links 57 are swingingly displaced, and a driving force of each of the right and left central links 57 is transmitted to the rear link 55 through the connection link 59. Thus, the right and left rear links 55 are swingingly displaced, and therefore the right and left front links 53 are swingingly displaced to adjust a tilt angle of the seat cushion 1a. That is, in a state when the seat cushion 1a of the driver seat 1 is set on the side of the rearmost position, each of the front link 53 and the central link 57 is in a rearwardly tilted position, and the connection shaft 56 provided at a rear end of the rear link 55 is in a lowered position, as shown in FIG. 6. Thus, a seating surface of the seat cushion 1a is maintained in a largely rearwardly tilted position.

Figure 11:
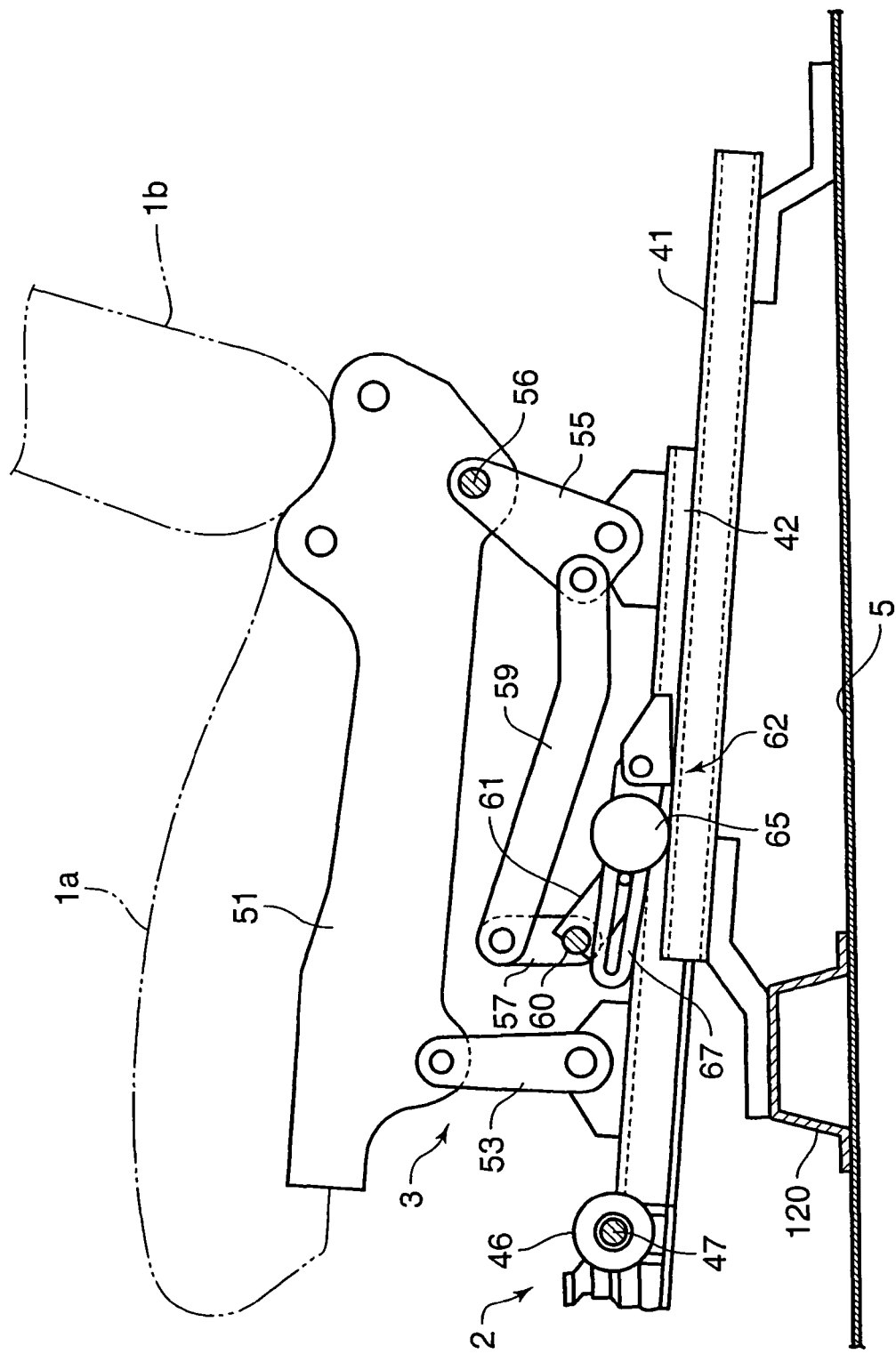
FIG. 11 is a side view showing a state after a seat cushion is moved in a frontward direction of a vehicle body.

In the above structure, when the longitudinal-position adjusting switch is manually operated in the direction for forward movement of the driver seat 1, a control signal for driving the drive motor 65 of the tilt-angle adjustment mechanism 3 in a normal direction is output from control means (not shown), according to a preset drive characteristic. Then, a normal rotational driving force of the drive motor 65 is transmitted to the right and left center links 57 through the gear mechanism 66, the screw shaft 64, the connection pin 63, the drive lever 61 and the drive shaft 60, and each of the right and left central links 57 is moved from the rearwardly tilted position to an upstanding position, as shown in FIG. 11. Then, as each of the right and left central links 57 is moved to the upstanding position, a driving force of each of the right and left central link 57 is transmitted to the rear link 55 through the connection link 59, and respective front ends of the right and left rear links 55 are pulled frontwardly. Thus, the connection shaft 56 provided at the rear ends of the right and left rear links 55 is lifted, and therefore the rear end of the seat cushion 1a is drivenly pushed and moved upwardly.

Further, in conjunction with the swing displacement of the right and left rear links 55, each of the right and left front links 53 is moved from the rearwardly tilted position to the upstanding position, and therefore the seat cushion 1a is drivenly moved frontwardly while the front end thereof is pushed and moved upwardly. Thus, the seat cushion 1a is displaced from the lowered position to a lifted position, as shown in FIG. 11. In the first embodiment, a lift amount in the rear end of the seat cushion 1a is set to be greater than that in the front end of the seat cushion 1a, so that, along with the upward movement of the seat cushion 1a, the rearward tilt angle of the seating surface of the seat cushion 1a will gradually decrease, and get close to a horizontal position. In conjunction with this movement, a reclining angle of a seat back 1b will gradually decrease and get closer to a vertical position.

When the longitudinal-position adjusting switch is manually operated in the direction for rearward movement of the driver seat 1, a control signal for driving the drive motor 65 of the tilt-angle adjustment mechanism 3 in a reverse direction is output from the control means, according to a preset drive characteristic. Then, a reverse rotational driving force of the drive motor 65 is transmitted to the right and left center links 57 through the gear mechanism 66, the screw shaft 64, the connection pin 63, the drive lever 61 and the drive shaft 60, and finally the seat cushion 1a is displaced from the lifted position to the lowered position, as shown in FIG. 6. Further, along with the downward movement of the seat cushion 1a, the rearward tilt angle of the seating surface of the seat cushion 1a will gradually increase, and the reclining angle of the seat back 1b will gradually increase.

If there is a difference in body height between two persons as drivers, other body size, such as seated height and leg length, is also different approximately in proportion to the difference in body height. Thus, an eye point of a driver seated in the driver seat 1 and operability of the control pedals, a steering wheel, etc., for the driver, vary depending on a body size of the driver. Therefore, an adequate seated position and driving posture of a driver seated in the driver seat 1, which allow an eye point of the driver to lie on the proper line L while allowing the driver to be seated in a comfortable posture, and allow a ball region of an operating-foot of the driver to be properly brought into contact with a depressing point of the control pedal, such as the depressing point 5*a* of the accelerator pedal 5, also vary depending on a body size of the driver.

A plurality of drivers having various body heights ranging from less than 150 cm to 186 cm or more may sit on the driver seat 1. Thus, it is necessary to allow each of such drivers to adequately perform a driving operation while sitting on the driver seat in a comfortable posture. As one example, on an assumption that a body height of an average-height person M who may most frequently sit on the driver seat 1 is 173 cm based on an average value of men in U.S.A., a comfortable posture of the average-height person M was statistically analyzed. As a result, the following data was obtained.

Figure 12:
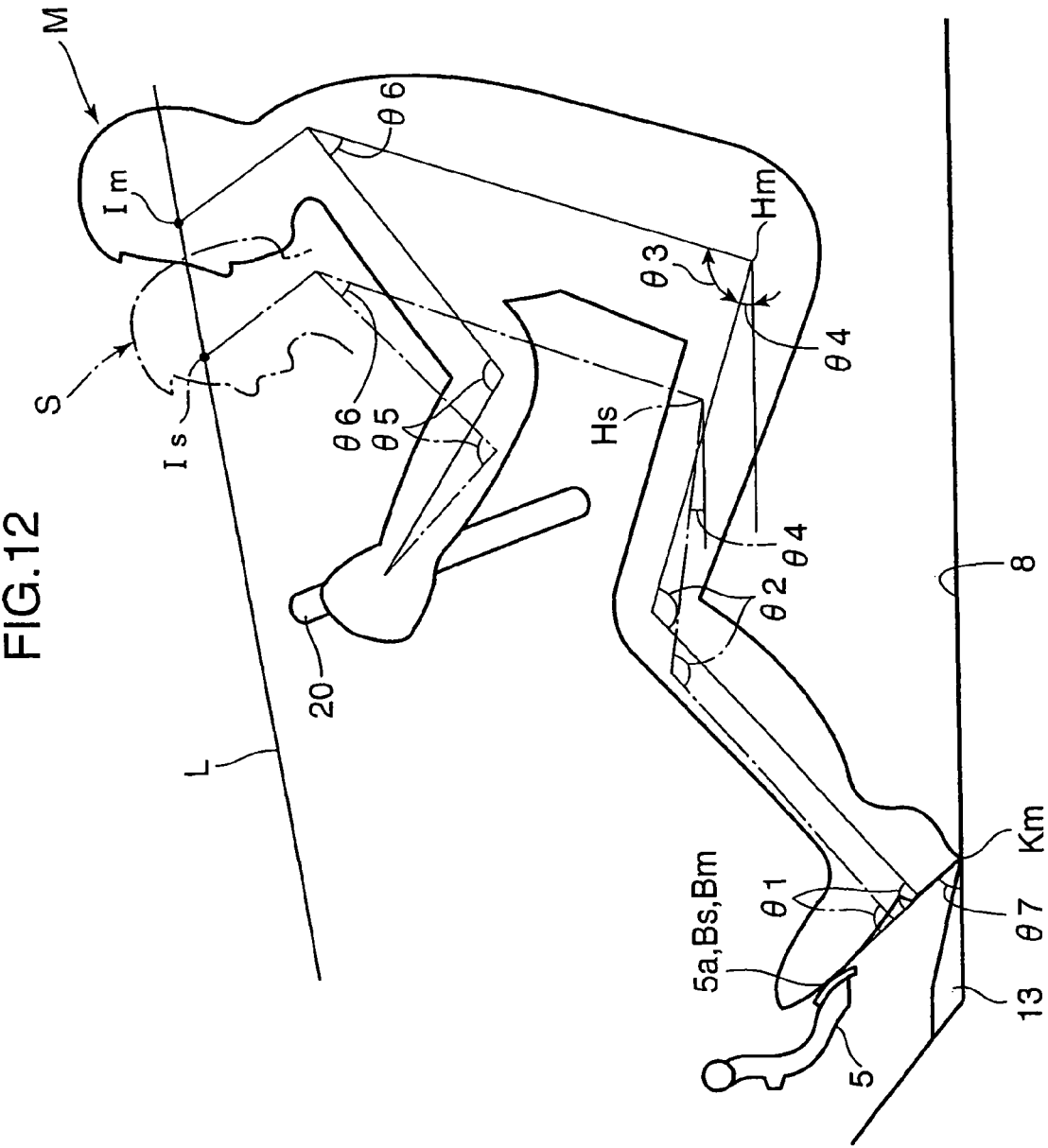
FIG. 12 is a side view showing a seated posture of each of an average-height person and a short person.

A comfortable posture of a passenger seated in the driver seat 1 means a seated posture which allows the passenger to keep the seated posture for a long period of time, and is suitable for a steering-wheel operation and a pedal-depressing operation. Specifically, as shown in FIG. 12, an angle of an ankle region (ankle angle) $\theta 1$ and a knee angle $\theta 2$ of an operating-foot are in the range of about 85 to 95 degrees, and in the range of about 115 to 135 degrees, respectively. Further, a bent angle $\theta 3$ between a thigh region and an upper body from a sidebone region to a shoulder region is about 95 degrees. In the average-height person M, through ergonomics experimental tests, it has been verified that an adequate value of a thigh angle $\theta 4$, which is an angle between a thigh region and a horizontal line, is a value obtained by adding about 1.5 degree to a tilt angle of the seat cushion 1*a*. An angle of an elbow region (elbow angle) $\theta 5$ and an arm angle $\theta 6$ for adequately operating a steering wheel 20 are in the range of about 100 to 130 degrees, and in the range of about 20 to 45 degrees, respectively. Further, a sole inclination angle (i.e., an inclination angle of a sole with respect to a horizontal line) $\theta 7$ for adequately operating the accelerator pedal 5 is about 52 degrees.

For example, a reference longitudinal position, a vertical reference height position and a reference tilt angle of the seat cushion 1*a*, are set to allow an eye point Im of the average-height person M to lie on a proper line L which extends obliquely downwardly and frontwardly by an angle of about 8 degrees, when the average-height person M sits on the driver seat 1 while setting the ankle angle $\theta 1$, the knee angle $\theta 2$, the bent angle $\theta 3$ (between a thigh region and an upper body from a sidebone region to a shoulder region), and the thigh angle $\theta 4$, at 90 degrees, 125 degrees, 95 degrees and 17 degrees, respectively. In this reference seated state of the average-height person M, each of the elbow angle $\theta 5$ and the arm angle $\theta 6$ can be set in the above range to allow the average-height person M to adequately grip the steering wheel 20, and a ball region Bm of a sole can be brought into contact with the depressing point 5*a* of the accelerator pedal 5 at an adequate sole inclination angle $\theta 7$ (52 degrees) under a condition that a heel Km of the operating-foot is placed on a predetermined reference position.

In FIG. 12, Hm indicates a hip point (seating reference point) of the average-height person M seated in the driver seat 1. The reference position for placement of the heel Km of the operating-foot of the average-height person M is set in a position corresponding to the valley-shaped bent region 19 formed in the boundary between the frontward region 11 and the rearward region 12 of the heel-placement zone 10, i.e., in the rear end of the inclined surface portion 14.

When the average-height person M seated in the driver seat 1 is changed to a short person S, such as a woman driver, as indicated by the two-dot chain line in FIG. 12, the short person S manually operates the longitudinal-position adjustment mechanism 2 and the tilt-angle adjustment mechanism 3 to move the seat cushion 1*a* of the driver seat 2 frontwardly, and correspondingly lift the height position of the seat cushion 1*a* while reducing the tilt angle of the seat cushion 1*a* with respect to the horizontal line, in order to allow an eye point Is to lie on the proper line L while ensuring the steering-wheel operability and pedal operability.

For example, in case where the short person S seated in the driver seat 1 has a body height of 150 cm, a hip point Hs located on the seat cushion 1*a* is moved frontwardly from the reference longitudinal position Hm of the average-height person M by about 105 mm. In conjunction with this movement, the hip point Hs is moved upwardly by about 25 cm, and the tilt angle of the seat cushion 1*a* is changed to allow the thigh angle $\theta 4$ to be set at about 10.5 degrees. This makes it possible to move an upper body of the short person S having a shorter arm than that of the average-height person M, frontwardly, so as to allow the short person S to adequately grip the steering wheel 20, and move an eye point Is of the short person S, frontwardly and upwardly so as to allow the eye point Is to lie on the proper line L.

Further, along with the frontward upward movements of the seat cushion 1*a*, an operating-foot of the short person S is apt to be moved frontwardly and upwardly. Thus, the knee angle $\theta 2$ is increased to about 130 degrees correspondingly to the frontward and upward movement, so that the ankle angle $\theta 1$ can be kept at 90 degrees while keeping the sole inclination angle $\theta 7$ at an angle close to the adequate angle (52 degrees), to allow a ball region Bs of the short person S to be brought into contact with the depressing point 5*a* of the accelerator pedal 5.

Figure 13:
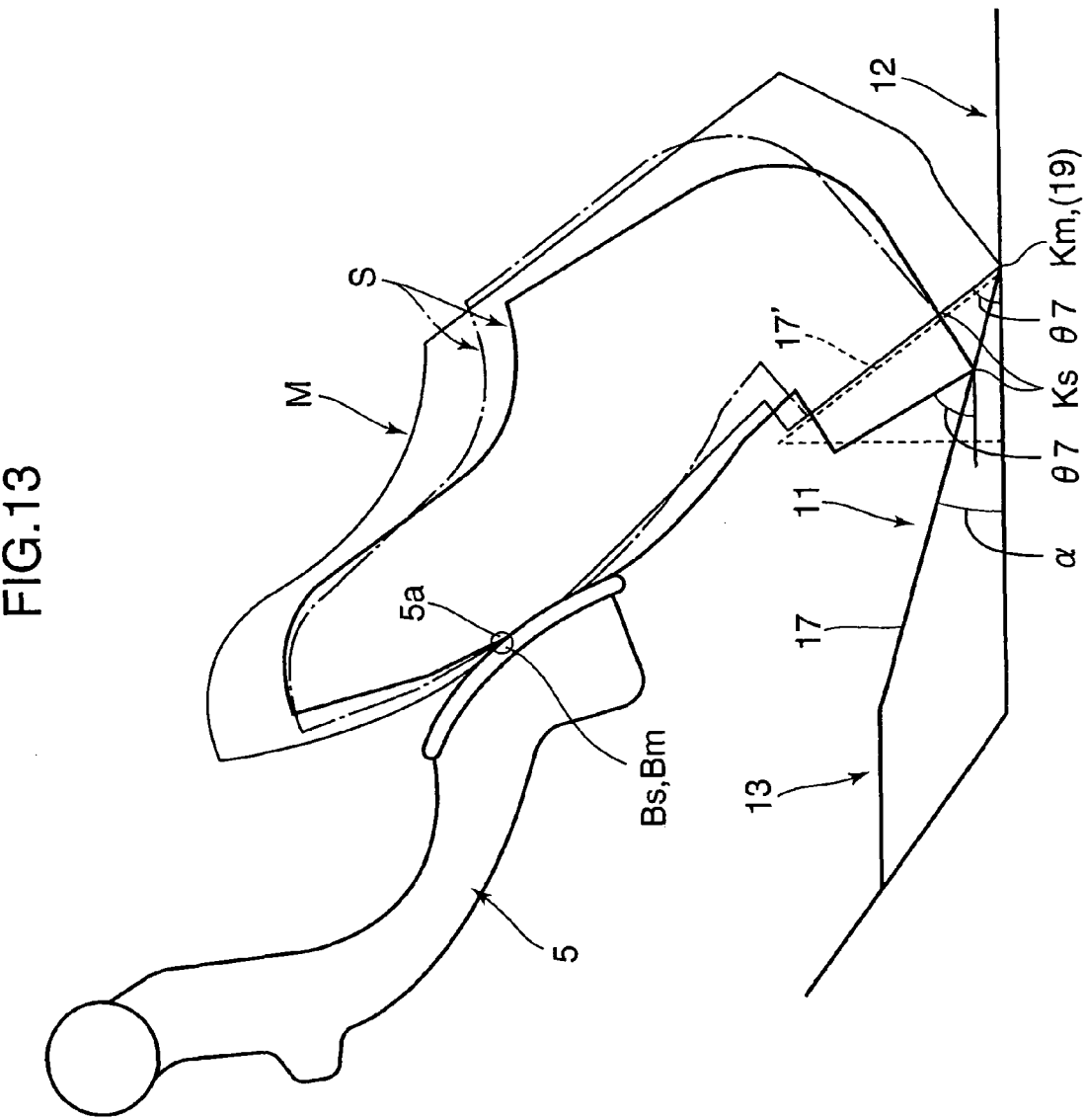
FIG. 13 is a side view showing a seated posture of each of a tall person and an average-height person.

As shown in FIG. 13, a distance (about 15.5 cm) between a heel Ks to the ball region Bs of the short person S is less than that (about 18.0 cm) of the average-height person M by about 2.5 cm. Thus, if each of the ankle angle $\theta 1$ and the sole inclination angle $\theta 7$ is kept at the above angle while maintaining a contact state between the ball region Bs of the operating-foot and the depressing point 5*a* of the accelerator pedal 5, the heel Ks will be located above the heel Km of the average-height person M by about 2 cm (=sin 52 degrees×2.5 cm).

Therefore, as indicated by the broken line in FIG. 13, an inclined surface portion formed to have an upper surface 17' extending obliquely upwardly and frontwardly by an angle of about 52 degrees is provided in the heel-placement zone 10. This makes it possible to allow the short person S to place the heel Ks of the operating-foot on the upper surface 17' of the inclined surface portion while allowing the ball region Bs of the operating-foot to be accurately brought into contact with the depressing point 5*a* of the accelerator pedal 5*a*. In this case, if the inclination angle of the upper surface 17' of the inclined surface portion is set at a large value of about 52 degrees, a slipping of the heel Ks is liable to occur, which causes difficulty in stabilizing the heel-placement state.

For this reason, in the first embodiment, the inclined surface portion 14 and the sector-shaped portion 14 each having an upper surface (17, 18) extending obliquely upwardly and frontwardly at an inclination angle α of 13.5 to 23.5 degrees, e.g., 18.5 degrees are provided in the heel-placement zone 10. The inclined surface portion 14 and the sector-shaped portion 14 are configured to allow the ball region Bs of the operating-foot of the short person S to be brought into contact with the depressing point 5a of the accelerator pedal 5 by moving the operating-foot to increase the sole inclination angle θ7 by about 6 degrees so as to change the sole inclination angle θ7 from the adequate angle (52 degree) to about 58 degrees, as indicated by the solid line in FIG. 13, under a condition that the short person S places the heel Ks of the operating-foot on the inclined surface portion 14 or the sector-shaped portion 15.

When the sole inclination angle θ7 is changed from 52 to 58 degrees, the ankle angle θ1 is likely to be reduced to less than 90 degrees. Thus, the knee angle θ2 of the short person S may be increase to greater than 130 degrees to appropriately stretch the knee so as to reliably prevent the ankle angle θ1 from being reduced to a value (e.g., 85 degree or less) out of the adequate range. Further, the ball region Bs of the operating-foot may be located slightly below the depressing point 5a of the accelerator pedal 5. In this manner, the change in the ankle angle θ1 can be more reliably suppressed.

Figure 14:
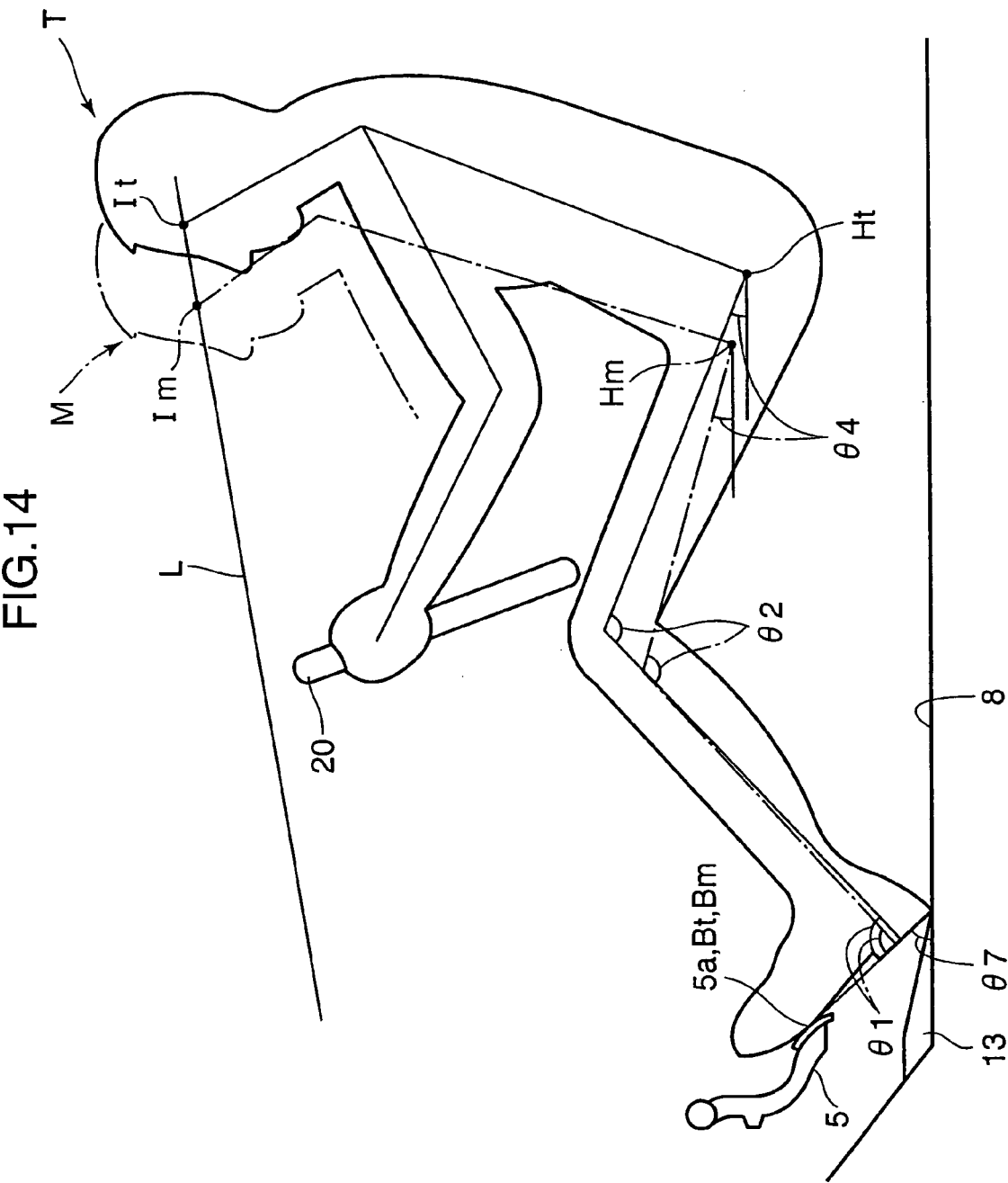
FIG. 14 is an explanatory diagram showing a heel-placement state of a short person.

As shown in FIG. 14, in case where the tall person T seated in the driver seat 1 has a body height, for example, of 186 cm, a hip point Ht located on the seat cushion 1a is moved rearwardly from the reference longitudinal position Hm of the average-height person M by about 85 mm. In conjunction with this movement, the hip point Hs is moved downwardly by about 20 cm, and the tilt angle of the seat cushion 1a is changed to allow the thigh angle θ4 to be set at about 20.0 degrees. This makes it possible to move an upper body of the tall person T having a longer arm than that of the average-height person M, rearwardly, so as to allow the tall person T to adequately grip the steering wheel 20, and move an eye point It of the short person S, frontwardly and upwardly so as to allow an eye point Is to lie on the proper line L.

Further, along with the rearward downward movements of the seat cushion 1a, the tall person T is apt to desire to move his/her operating-foot rearwardly and downwardly. Thus, the knee angle θ2 is reduced to about 120 degrees correspondingly to the rearward and downward movement, so that the ankle angle θ1 can be kept at 90 degrees while keeping the sole inclination angle θ7 at an adequate angle of 52 degrees, to allow a ball region Bt of the tall person T to be brought into contact with the depressing point 5a of the accelerator pedal 5.

Figure 15:
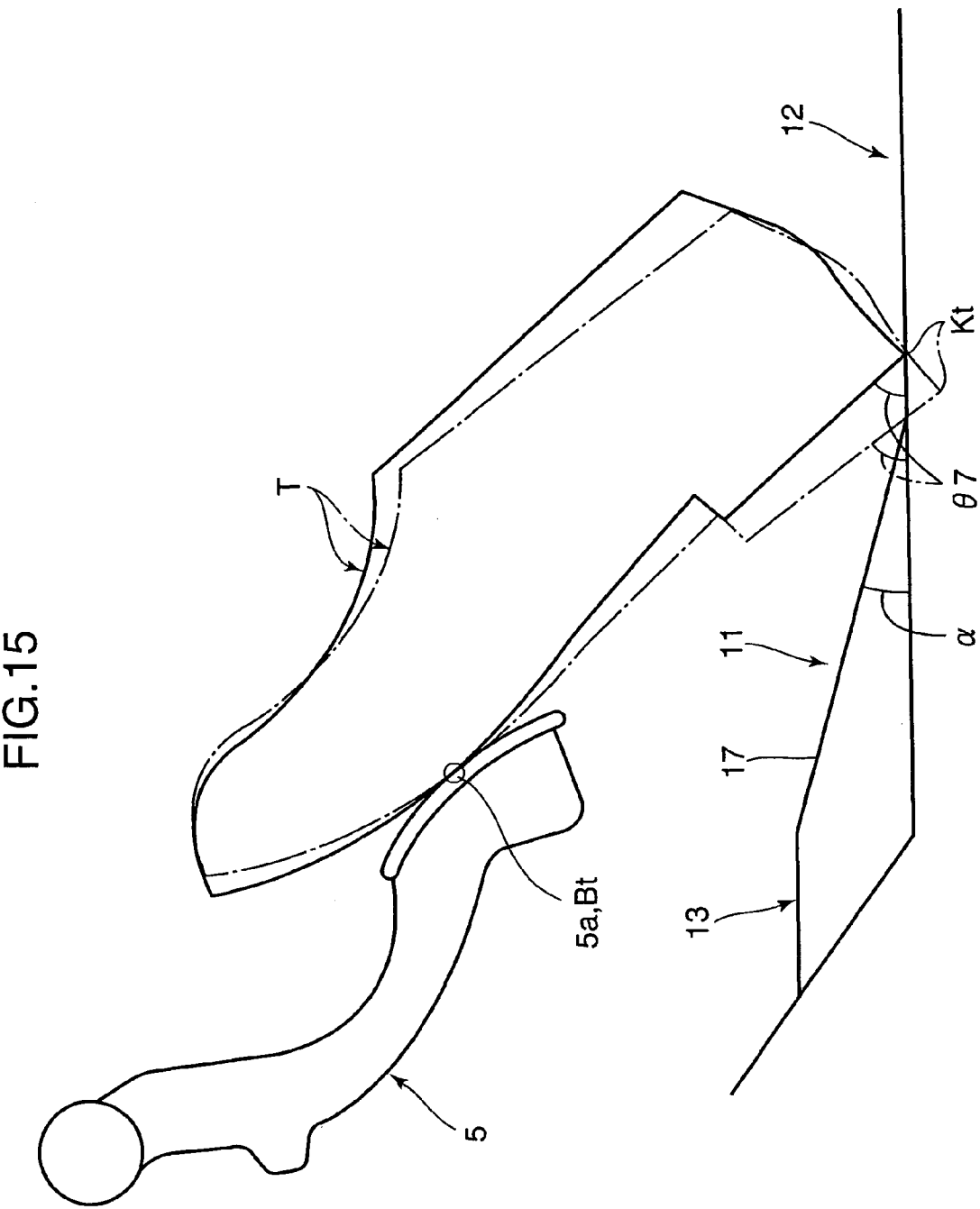
FIG. 15 is an explanatory diagram showing a heel-placement state of a tall person.

As shown in FIG. 15, a distance (about 19.5 cm) between a heel Kt to the ball region Bt of the tall person T is greater than that (about 18.0 cm) of the average-height person by about 1.5 cm. Thus, if each of the ankle angle θ1 and the sole inclination angle θ7 of the tall person T is kept at the above angle while maintaining a contact state between the ball region Bs of the operating-foot and the depressing point 5a of the accelerator pedal 5, the heel Ks will be located below the heel Km of the average-height person M by about 1.2 cm (=sin 52 degrees× 1.5 cm) (see the two-dot chain line in FIG. 15). However, as indicated by the solid line in FIG. 15, the sole inclination angle θ7 of the tall person T may be reduced by about 4 degrees and changed from the adequate angle (52 degrees) to about 48 degrees to allow the ball region Bt of the operating-foot of the tall person T to be brought into contact with the depressing point 5a of the accelerator pedal 5, as indicated by the solid line in FIG. 15, under a condition that the tall person T places the heel Kt on the approximately horizontal floor portion 8 located rearward of the inclined surface portion 14.

When the sole inclination angle θ7 is changed from 52 to 48 degrees, the ankle angle θ1 is likely to be increased to greater than 90 degrees. Thus, the knee angle θ2 may be reduced to less than 120 degrees to appropriately bend the knee so as to reliably prevent the ankle angle θ1 from being increased to a value (e.g., 95 degree or more) out of the adequate range. Further, the ball region Bt of the operating-foot may be located slightly above the depressing point 5a of the accelerator pedal 5. In this manner, the change in the ankle angle θ1 can be more reliably suppressed.

As described above, in the floor structure on the driver side of the vehicle where the accelerator pedal 5 and the brake pedal 4 serving as a control pedal adapted to be depressedly operated by a driver seated in the driver seat 1 is arranged at the front of the passenger compartment, the heel-placement zone 10 is provided on the approximately horizontal floor portion 8 located rearward of a depressing point of the control pedal, such as the depressing point 5a of the accelerator pedal 5, and formed to have the frontward region 11 adapted to allow the short person S seated in the driver seat 1 to place the heel Ks thereon and the rearward region 12 adapted to allow the tall person T seated in the driver seat 1 to place the heel Kt thereon, wherein the inclined surface portion 14 is formed in at least part of the heel-placement zone 10 in such a manner as to rise relative to a surrounding area of the floor portion and have an upper surface extending obliquely upwardly and frontwardly. This makes it possible to adjust a driving posture readily and adequately with a simple structure to allow the driver seated in the driver seat 1 to adequately operate the control pedal.

Specifically, the inclined surface portion 14 is formed in the frontward region 11 of the heel-placement zone 10 in such a manner that the upper surface 17 extends obliquely upwardly and frontwardly at an inclination angle α of 13.5 to 23.5 degrees. Thus, under a condition that the short person S having a smaller sole size than that of the average-height person M places the heel Ks of his/her operating-foot on the upper surface 17 of the inclined surface portion 14, the ball region Bs of the operating-foot can be brought into contact with the depressing point 5a of the accelerator pedal 5 while keeping each of an ankle angle θ1 and a sole inclination angle θ7 of the operating-foot, at an adequate value. This provides an advantage of being able to perform a pedal-depressing operation, particularly for the acceleration pedal 5, without the occurrence of difficulty in delicately perform the pedal-depressing operation due to a situation where the heel Ks is spaced apart from a floor surface during the pedal-depressing operation, and without the occurrence of difficulty in quickly operating the control pedal due to a situation where each of the ankle angle θ1 and the sole inclination angle θ7 is largely deviated from the adequate value.

The inclined surface portion may be formed in both the frontward region 11 and the rearward region 12 of the heel-placement zone 10, in a continuous manner. However, even if the inclined surface portion 14 is formed only in the frontward region 11 of the heel-placement zone 10, as in the first embodiment, pedal operability for the short person S whose heel Ks is likely to be spaced apart from a floor surface due to a relatively small sole size thereof can be effectively increased.

As shown in FIGS. 14 and 15, in case of a tall parson T, the sole inclination angle θ7 and the knee angle θ2 may be reduced to allow the ball region Bt of the operating-foot of the tall person T to be brought into contact with the depressing point of the control pedal, such as the accelerator pedal 5, without moving the heel Kt downwardly. Thus, even if the rearward region 13 for placement of the heel Kt of the tall person T is set in the approximately horizontal floor portion 8, the operation of depressing the accelerator pedal 5 is never adversely affected. In addition, the rearward region 12 arranged on the approximately horizontal floor portion 8 makes it possible to allow the tall person T to readily recognize that the rearward region 12 is a heel-placement region for the heel Kt of the tall person T An arc-shaped continuous connection portion may be provided in the rear end of the pad member 13 constituting the inclined surface portion 14 to smoothly connect the inclined surface portion 14 and the approximately horizontal surface portion (floor portion 8) located rearward of the rear end. However, in the configuration where the valley-shaped bent region 10 is formed between the rear end of the inclined surface portion 14 and the approximately horizontal surface portion (floor portion 8) located rearward of and continuous with the rear end, to extend in a lateral direction of the vehicle, as in the first embodiment, the average-height person M who may most frequently sit the driver seat 1 can recognize a heel-placement position for the heel Km of the operating-foot readily and accurately, based on the valley-shaped bent region 10. This makes it possible to effectively improve convenience for the average-height person M.

In the first embodiment, the inclination angle $\alpha$ of the upper surface 17 of the inclined surface portion 14 formed in the heel-placement zone 10 is set in the range of 13.5 to 23.5 degrees with respect to a horizontal plane. This provides an advantage of being able to prevent the heel Ks of the operating-foot of the short person S from being spaced apart from a floor surface, while allowing the short person S to stably place the heel Ks on the inclined surface portion 14.

Specifically, if the inclination angle $\alpha$ of the upper surface 17 of the inclined surface portion 14 is greater than 23.5 degrees, the heel of the operating-foot placed on the inclined surface portion 14 is likely to slidingly fall down rearwardly according to a reaction force during a pedal-depressing operation to cause difficulty in obtaining a stable heel-placement state. Thus, the inclination angle $\alpha$ is preferably set to be 23.5 degree or less. If the inclination angle $\alpha$ of the upper surface 17 of the inclined surface portion 14 is less than 13.5 degrees, an intended function of the inclined surface portion 14, i.e., a function of allowing the short person S to bring the ball region Bs of the operating-foot into contact with the depressing point 5$a$ of the accelerator pedal 5 under a condition that the short person S places the heel Ks on the upper surface 17 of the inclined surface portion 14, cannot be obtained. Thus, the inclination angle $\alpha$ is preferably set to be 13.5 degree or more.

In the first embodiment, the seat adjustment mechanism comprising the longitudinal-position adjustment mechanism 2 and the tilt-angle adjustment mechanism 3 is provided to move the driver seat 1 frontwardly and rearwardly, and reduce a rearward tilt angle of the seat cushion 1$a$ of the driver seat 1 in conjunction with the forward movement of the driver seat 1. Thus, a driver seated in the driver seat 1 can adequately set a drive characteristic of the longitudinal-position adjustment mechanism 2 and the tilt-angle adjustment mechanism 3 depending on a body size of the driver. This provides an advantage of being able to automatically adjust the longitudinal position of the driver seat 1 and the tilt angle of the seat cushion 1$a$ to allow an eye point of the driver to lie on a proper line L while maintaining a seated posture of the driver, and obtain excellent steering-wheel operability and pedal operability.

Further, even if a seated posture of the driver seated in the driver seat 1 is changed along with the operation of adjusting the longitudinal position of the driver seat 1 and the tilt angle of the seat cushion 1$a$, the inclined surface portion 14 formed in at least part of the heel-placement zone 10 to extend obliquely upwardly and frontwardly makes it possible to allow the ball region Bs of the short person S having a small sole size to be brought into contact with the depressing point 5$a$ of the accelerator pedal 5 while keeping each of the ankle angle $\theta 1$ and the sole inclination angle $\theta 7$ at an angle suitable for a petal-depressing operation, under a condition that the short person S places the heel Ks on the inclined surface portion 14, so as to advantageously ensure pedal operability.

In the first embodiment, the pad member 13 including the inclined surface portion 14 extending rightwardly (outwardly) from an installation area of the accelerator pedal 5 in top plan view, and the sector-shaped portion 15 concentrically disposed about a point on a vertical line extending through the rear portion of the depressing point 5$a$ of the accelerator pedal 5, are provided in the heel-placement zone 10, in such a manner that the inclined surface portion 14 is formed in a region rearward of the accelerator pedal to extend obliquely upwardly and frontwardly, and the sector-shaped portion 15 is formed on a left side of the inclined surface portion 14 in a continuous manner to have an upper surface with the same inclination angle as that of the inclined surface portion 14 and an arc conical shape about a point on a vertical line extending through the rear portion of the depressing point 5$a$ of the accelerator pedal 5. This provides advantage of being able to effectively prevent the occurrence of an undesirable situation where the heel Ks of the short person S is spaced apart from a floor surface, without adverse effects on a pedal-depressing operation by the tall person T and the short person M.

Figure 16:
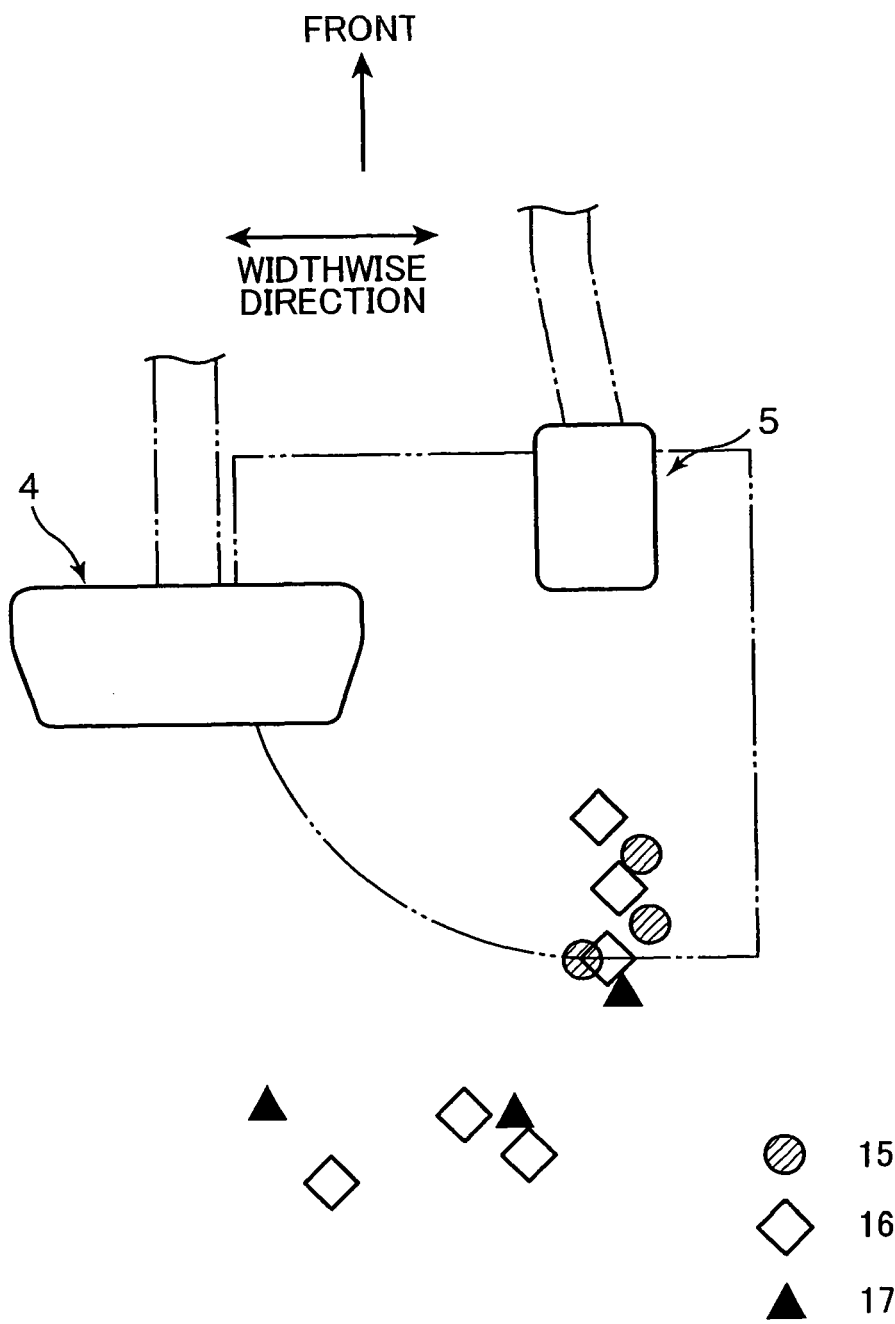
FIG. 16 is an explanatory top plan view showing a variation of a heel-placement position.

Specifically, as for three subjects having body heights falling within the range of 150 to 159 cm, six subjects having body heights falling within the range of 160 to 169 cm, and three subjects having body heights falling within the range of 170 to 179 cm, a heel-placement position during a normal driving condition (normal heel-placement position) in top plan view was checked. FIG. 16 shows obtained data. As seen in this data, normal heel-placement positions of the subjects having body heights falling within the range of 150 to 159 cm are concentrated on a relatively frontward side. Normal heel-placement positions of the subjects having body heights falling within the range of 170 to 179 cm are concentrated on a relatively rearward side, and normal heel-placement positions of the subjects having body heights falling within the range of 160 to 169 cm are scattered over a wide area.

The reason is that the short person S having a relatively small sole size cannot switch from one pedal-depressing position for the acceleration pedal 5 to another pedal-depressing position for the brake pedal 4, unless the heel-placement position for the heel of the operating-foot is largely moved, and thereby the normal heel-placement position is set at a position rearward of the accelerator pedal 5 to facilitate the operation of the accelerator pedal 5, whereas the tall person T having a relatively large sole size can switch from one pedal-depressing position for the acceleration pedal 5 to another pedal-depressing position for the brake pedal 4, without largely moving the heel-placement position for the heel of the operating-foot, and thereby the normal heel-placement position is set at a position rearward of a position between the accelerator pedal 5 and the brake pedal 5 to facilitate the switching of the pedal-depressing positions.

Thus, as shown, for example, in FIG. 2, the inclined surface portion 14 and the sector-shaped portion 15 each provided in the heel-placement zone are formed only in a region rearward of the accelerator pedal 5 to extend obliquely upwardly and frontwardly. This provides an advantage of being able to prevent the switching of the pedal-depressing positions from being hindered by the inclined surface portion 14 and the sector-shaped portion 15, and effectively prevent the heel of the short person S from being spaced apart from a floor surface.

Further, in the first embodiment, the laterally-extending valley-shaped bent region (see FIG. 4) formed between the inclined surface portion 14/the sector-shaped portion 15 and the floor portion 8 allows a driver seated in the driver seat 1 to recognize a boundary between the inclined surface portion 14/the sector-shaped portion 15 and the floor portion 8. This makes it possible to allow the driver to accurately figure out a heel-placement position for the driver, on the basis of the valley-shaped bent region.

Particularly, as shown in the first embodiment, each of the upper surfaces 17, 18 of the inclined surface portion 14 and the sector-shaped portion 15 is colored with a different color from that of the approximately horizontal surface portion (floor portion 8) located rearward of and continuous with the upper surfaces 17, 18. This makes it possible to allow a driver, particularly the short person, seated in the driver seat 1, to recognize a heel-placement position for the driver, more readily and accurately, based on the color given to the upper surfaces of the inclined surface portion 14 and the sector-shaped portion 15. This provides an advantage of being able to allow a driver to perform a pedal-depressing operation using the inclined surface portion 14 and the sector-shaped portion 15 in a contact manner, while preventing a driver from feeling odd due to addition of the inclined surface portion 14 and the sector-shaped portion 15 in the heel-placement zone 10.

Figure 17:
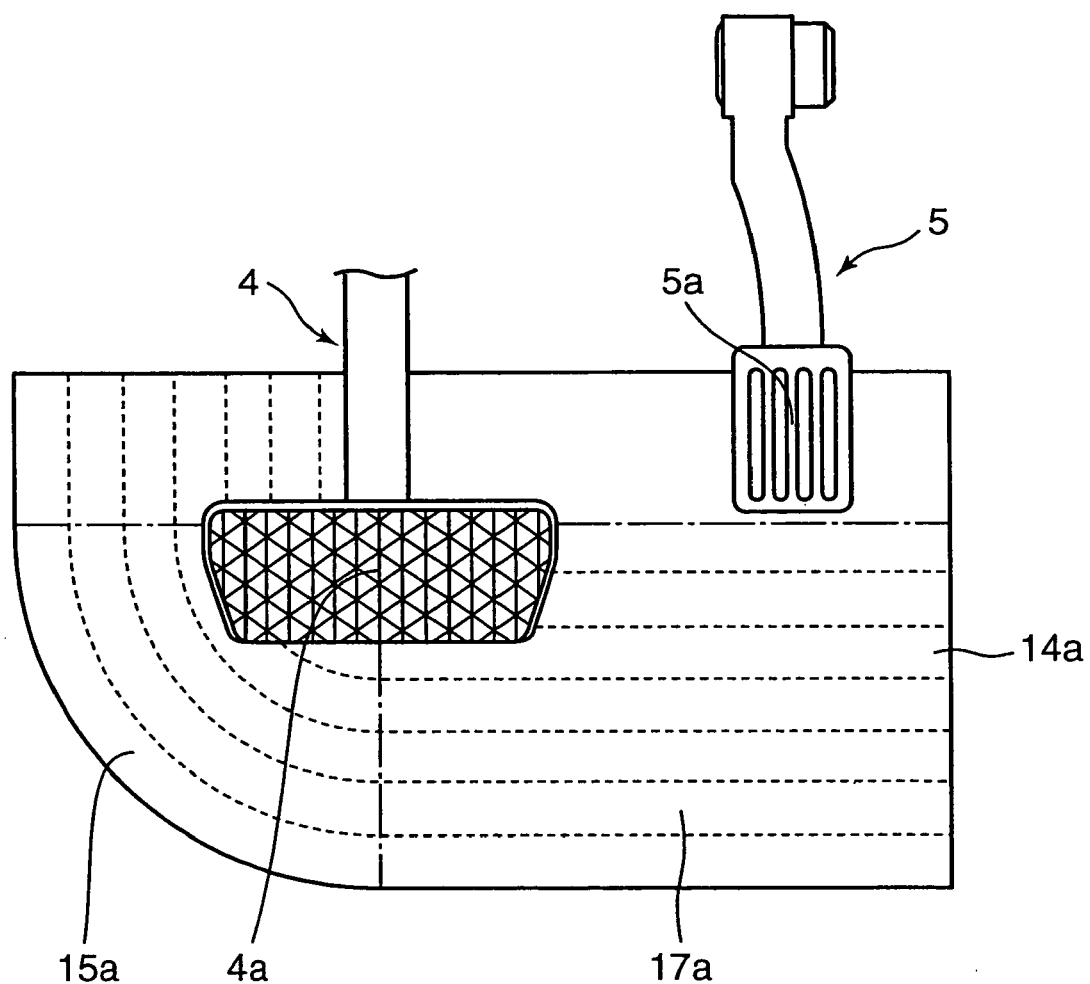
FIG. 17 is a top plan view showing a vehicle driver-side floor structure according to a second embodiment of the present invention, which corresponds to FIG. 2.

FIG. 17 shows a vehicle driver-side floor structure according to a second embodiment of the present invention. In the second embodiment, an inclined surface portion 14a having an upper surface 17a extending obliquely upwardly and frontwardly is formed to extend in a region from an installation area of an accelerator pedal 5 to an installation area of a brake pedal 4 in top plan view. Further, a sector-shaped portion 15b continuously extending from the inclined surface portion 14a and having an upper surface with the same inclination angle as that of the inclined surface portion 14a is formed in an arc conical shape about a point on a vertical line extending through the depressing point of the brake pedal 4.

As above, the inclined surface 14a having the upper surface 17a extending obliquely upwardly and frontwardly is arranged to extend over the respective installation areas of the accelerator pedal 5 and the brake pedal 4. For example, in case where the short person S seated on a driver seat operates the brake pedal 4 by his/her right foot, the short person S can switch between respective pedal-depressing positions for the accelerator pedal 5 and the brake pedal 4, while keeping each of an ankle angle θ1 and a sole inclination angle θ7 at an adequate value, under a condition that the short person S places the heel on the inclined surface portion 14a, and bring the ball region Bs of the short person S into contact with respective depressing points 4a, 5a.

Further, as shown in the second embodiment, the sector-shaped portion 15b extending from the inclined surface portion 14a and having an upper surface with the same inclination angle as that of the inclined surface portion 14a is formed on a left side of the inclined surface portion 14a. In this case, even when the short person S seated on the driver seat 1 operates the brake pedal 4 by his/her left foot, a braking operation can be performed while placing the heel on the sector-shaped portion 15a.

FIGS. 18 to 21 show a vehicle driver-side floor structure according to a third embodiment of the present invention. In the third embodiment, in a floor structure on a driver side of a vehicle where a control pedal includes a brake pedal 4 and an accelerator pedal 5 on a right side of the brake pedal 4, a pad member 21 comprises a first heel-placement portion 22 located rearward of the brake pedal 4, and a second heel-placement portion 23 located rearward of the accelerator pedal 5, and a connection portion 24 smoothly connecting the first and second heel-placement portion 22, is provided on a floor portion 8 located rearward of respective depressing points 4a, 5a of the brake pedal 4 and the accelerator pedal 5.

The first heel-placement portion 22 makes up an inclined surface sub-portion having an upper surface extending obliquely upwardly and frontwardly and having an inclination angle α of about 16 to 24 degrees with respect to a horizontal plane. Further, the first heel-placement portion 22 has a frontward-rearward (i.e., longitudinal) dimension set such that a rear end of the first heel-placement portion 22 is located slightly frontward of a heel-placement position for an average-height person M. The second heel-placement portion 23 makes up an inclined surface sub-portion having an upper surface extending obliquely upwardly and frontwardly and having an inclination angle β less than that of the upper surface of the first heel-placement portion 22, e.g., in the range of 10 to 15 degrees with respect to the horizontal plane. Further, the second heel-placement portion 23 has a longitudinal dimension set to be greater than that of the first heel-placement portion 22. For example, the longitudinal dimension of the second heel-placement portion 23 is set to allow the second heel-placement portion 23 to extend over a longitudinal region which has a possibility that any driver seated on the driver seat 1 places a heel of his/her operating-foot thereon.

Figure 18:
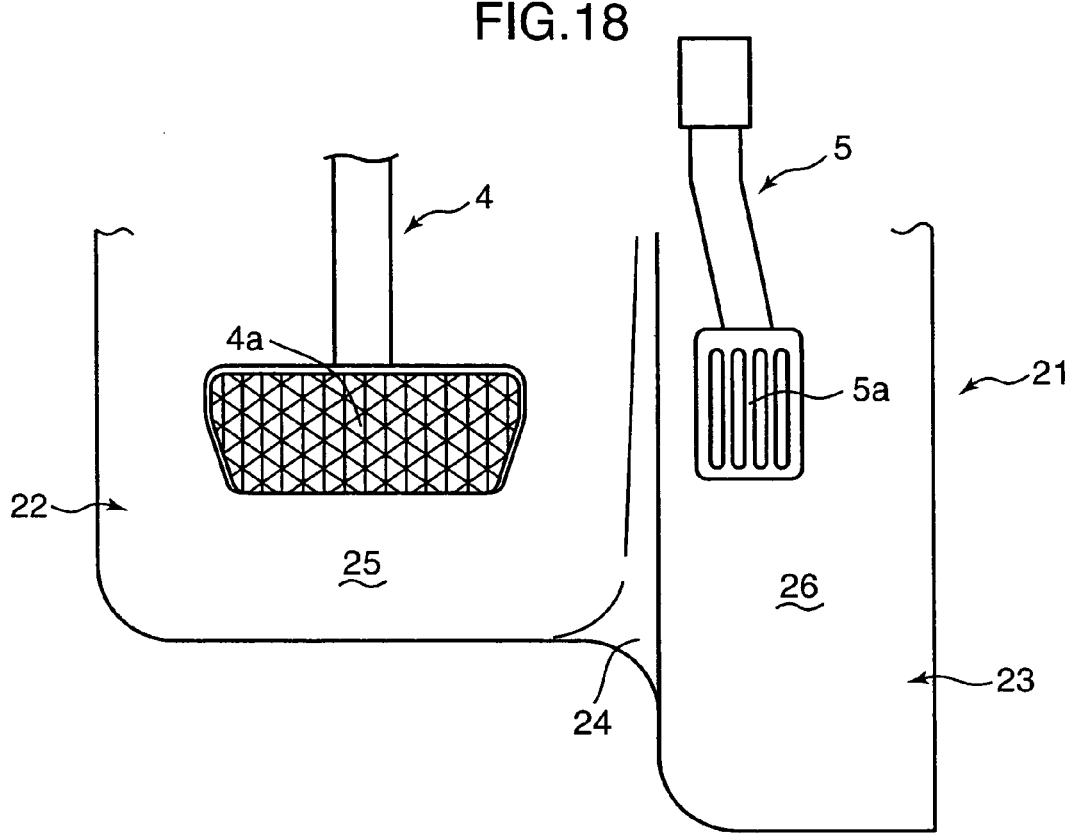
FIG. 18 is a top plan view showing a vehicle driver-side floor structure according to a third embodiment of the present invention, which corresponds to FIG. 2.
Figure 19:
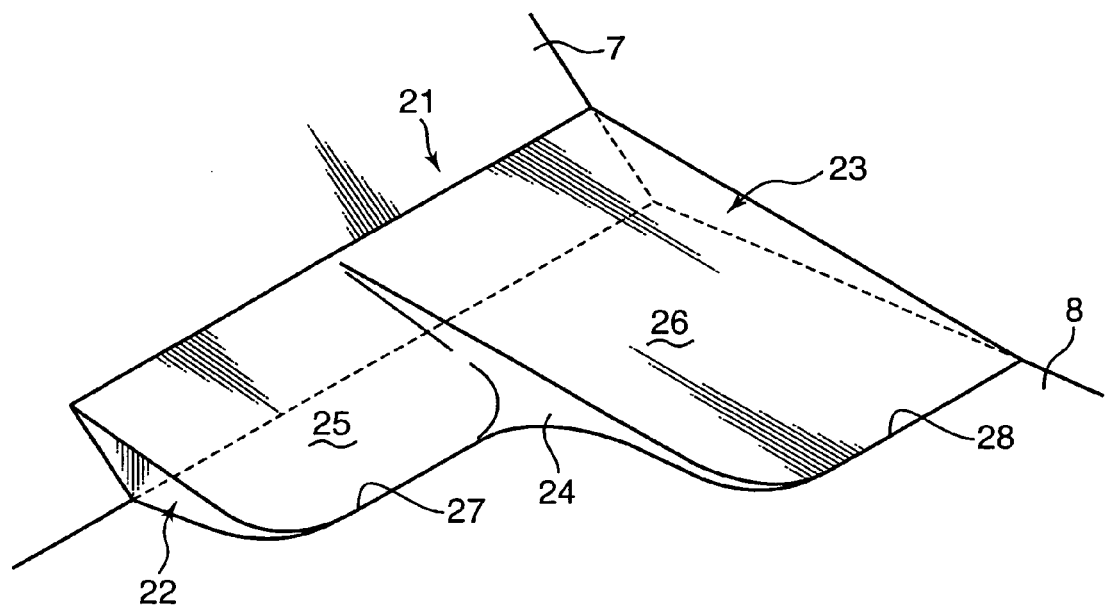
FIG. 19 is a perspective view showing a pad member in the vehicle driver-side floor structure according to the third embodiment.
Figure 21:
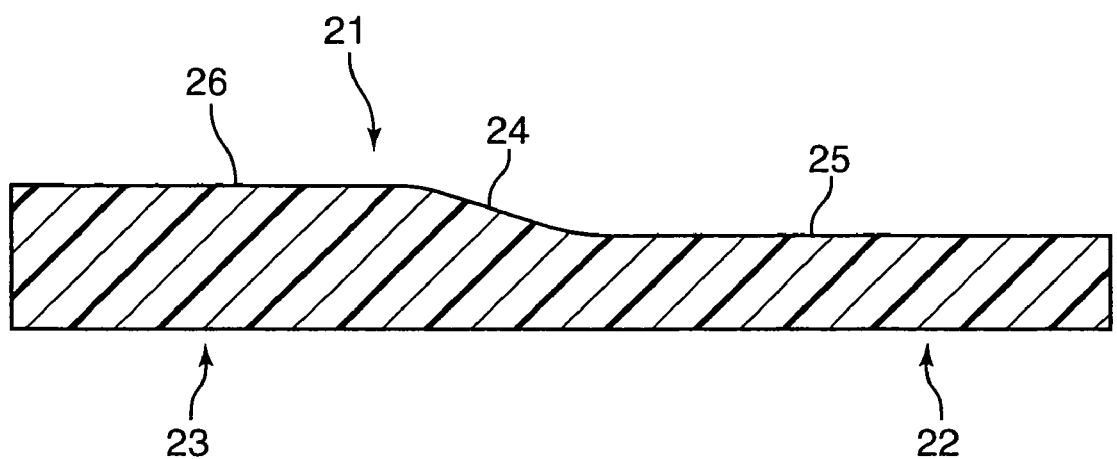
FIG. 21 is a sectional view taken along the line XXI-XXI in FIG. 20.

As shown in FIGS. 18 and 19, the connection portion 24 formed in the pad member 21 is formed to connect the rear end of the first heel-placement portion 22 and a rear end of the second heel-placement portion 23 in an arc shape in top plan view, to prevent a step from being formed therebetween due to the configuration where the longitudinal dimension of the first heel-placement portion 22 is less than that of the second heel-placement portion 23. Further, as shown in FIG. 21, the connection portion 24 is formed to smoothly connect respective opposed lateral ends of the first heel-placement portion 22 and the second heel-placement portion 23 in front view, to prevent a step from being formed therebetween due to the configuration where the upper surfaces 22, 23 of the first and second heel-placement portions 22 have different inclination angles.

Figure 20:
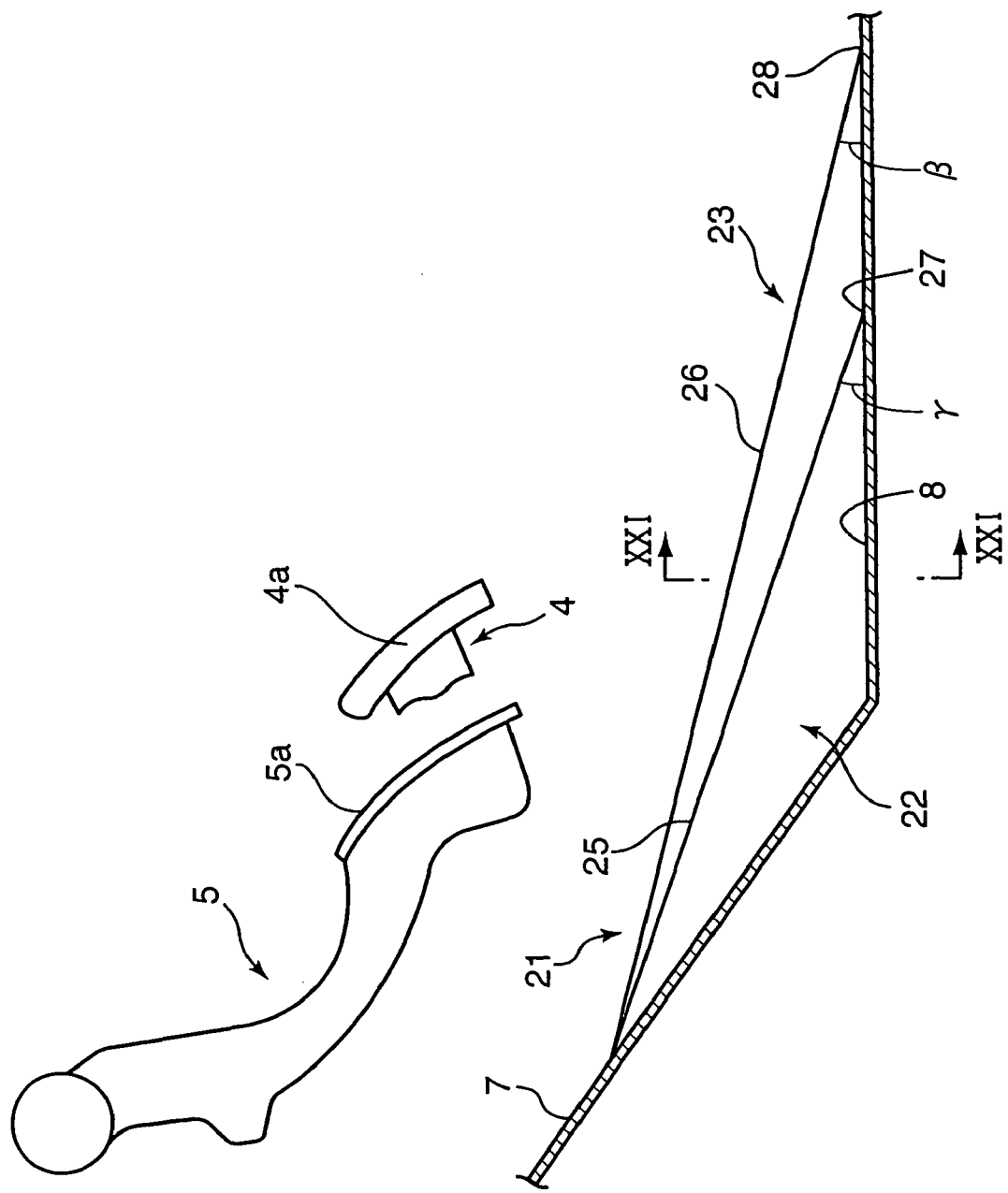
FIG. 20 is a sectional side view showing the pad member in FIG. 19.

The pad member 21 is fixed onto the floor portion 8 by an adhesive or a fastener, so that an inclined surface portion comprising the first heel-placement portion 22 having the upper surface rising relative to other region and the second heel-placement portion 23 each having an upper surface rising relative to other region is formed in a part of a heel-placement zone adapted to allow a driver to place his/her heel thereon. Further, as shown in FIGS. 20 and 21, two valley-shaped bent regions 27, 28 are formed between the rear end of the first heel-placement portion 22 and an approximately horizontal floor portion 8 located rearward of the rear end and between the rear end of the second heel-placement portion 23 and an approximately horizontal floor portion 8 located rearward of the rear end, respectively.

As above, in the third embodiment, the first heel-placement portion 22 located rearward of the brake pedal 4, and the second heel-placement portion 23 located rearward of the accelerator pedal 5, make up the inclined surface portion which rises relative to a surrounding region of the floor portion and having the upper surface extending obliquely upwardly and frontwardly. This also provides an advantage of being able to adjust a driving posture readily and adequately with a simple structure so as to allow a driver seated in the driver seat 1 to adequately operate the control pedal including the brake pedal 4 and the accelerator pedal 5.

Figure 22:
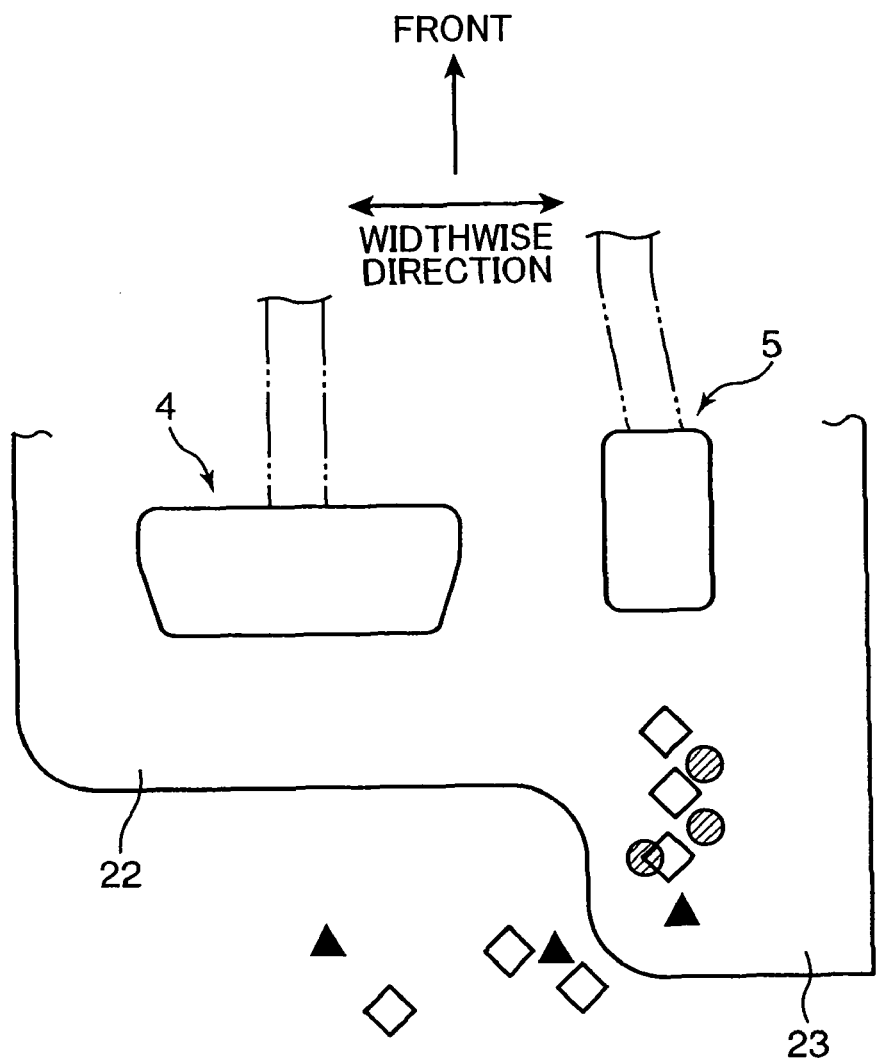
FIG. 22 is an explanatory top plan view showing a variation of a heel-placement position.

Specifically, as for three subjects having body heights falling within the range of 150 to 159 cm, six subjects having body heights falling within the range of 160 to 169 cm, and three subjects having body heights falling within the range of 170 to 179 cm, a heel-placement position during a normal heel-placement position in top plan view was checked. FIG. 22 shows obtained data. As seen in this data, normal heel-placement positions of the subjects having body heights falling within the range of 150 to 159 cm are concentrated in a position rearward of the accelerator pedal 5 and on a relatively frontward side. Normal heel-placement positions of the subjects having body heights falling within the range of 170 to 179 cm are concentrated in a position between the brake pedal 4 and the accelerator pedal 5 and on a relatively rearward side, and normal heel-placement positions of the subjects having body heights falling within the range of 160 to 169 cm are scattered over a wide area.

Figure 23:
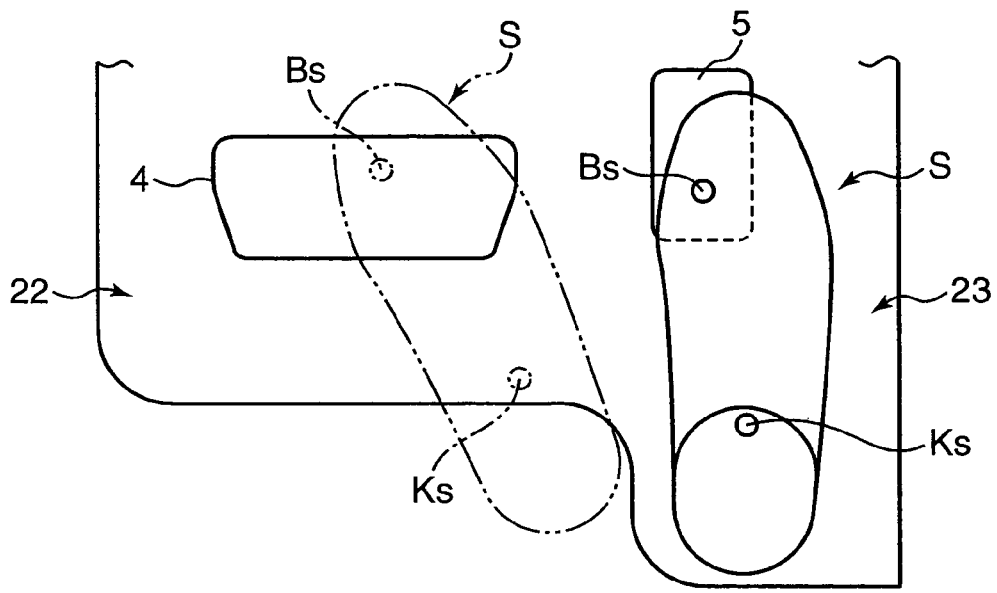
FIG. 23 is an explanatory top plan view showing a pedal-depressing operation by a short person.
Figure 24:
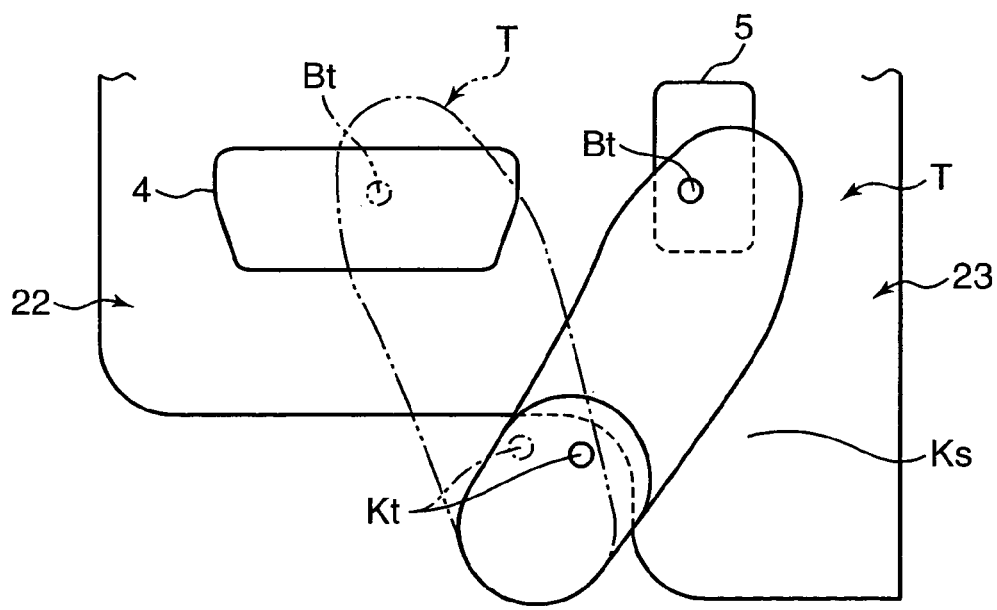
FIG. 24 is an explanatory top plan view showing a pedal-depressing operation by a tall person.

The reason is that the short person S having a relatively small sole size cannot switch from one pedal-depressing position for the acceleration pedal 5 to another pedal-depressing position for the brake pedal 4 unless a heel-placement position for the heel Ks is largely moved, as shown in FIG. 23, and thereby the normal heel-placement position is often set at a position rearward of the accelerator pedal 5 to facilitate the operation of the accelerator pedal 5, whereas the tall person T having a relatively large sole size can switch from one pedal-depressing position for the acceleration pedal 5 to another pedal-depressing position for the brake pedal 4 without largely moving a heel-placement position for the heel Kt, as shown in FIG. 24, and thereby the normal heel-placement position is set at a position rearward of a position between the accelerator pedal 5 and the brake pedal 5 to facilitate the switching of the pedal-depressing positions.

Thus, as shown in the third embodiment, the second heel-placement portion 23 having a larger longitudinal dimension than that of the first heel-placement portion 22 is formed in a region located rearward of a depressing point $5a$ of the accelerator pedal 5 in top plan view, in such a manner that the upper surface 26 of the second heel-placement portion 23 extends obliquely upwardly and frontwardly toward the depressing point $5a$ of the accelerator pedal 5. This allows the short person S having a smaller sole size than that of the tall person T to bring the ball region of the short person S in contact with the depressing point $5a$ of the accelerator pedal 5 while keeping each of an ankle angle $\theta 1$ and a sole inclination angle $\theta 7$ at an adequate value, under a condition that the short person S places the heel Ks of his/her operating-foot on the second heel-placement portion 23. This provides an advantage of being able to depressedly operate the acceleration pedal 5 readily and adequately while preventing the occurrence of difficulty in delicately operating the accelerator pedal 5, due to a situation where the heel Ks of the short person S is spaced apart from a floor surface during the pedal-depressing operation, and further preventing the occurrence of difficulty in quickly operating the acceleration pedal 5, due to a situation where each of the ankle angle $\theta 1$ and/or the sole inclination angle $\theta 7$ is largely deviated from the adequate value.

When the short person S slowly operates the brake pedal 4, the heel Ks can be moved to the upper surface of the first heel-placement portion 22. This provides an advantage of being able to allow the ball region Bs to be brought into contact with the depressing point $4a$ of the brake pedal 4 while keeping each of the ankle angle $\theta 1$ and/or the sole inclination angle $\theta 7$ approximately at an adequate value, so as adequately operate the brake pedal 4. In addition, the longitudinal dimension of the first heel-placement portion 22 is set to be less than that of the second heel-placement portion 23. Thus, when the short person S quickly operates the brake pedal 4, the ball region Bs can be brought into contact with the depressing point of the brake pedal 4 while effectively preventing the heel Ks from interfering with the rear end of the first heel-placement portion 22, so as to perform a sudden braking operation.

As mentioned above, in case of the tall person T, each of the ankle angle $\theta 1$ and the sole inclination angle $\theta 7$ may be reduced so that the ball region Bt can be brought into contact with the depressing point $5a$ of the acceleration pedal 5 without moving the heel Kt of the operating-foot (see FIGS. 14 and 15) downwardly. Thus, in the above configuration where the longitudinal dimension of the first heel-placement portion 22 located rearward of the brake pedal is set to be less than that of the second heel-placement portion 23 located rearward of the accelerator pedal 23, even if a heel-placement region for the heel Kt of the operating-foot is set on the approximately horizontal floor portion 8 located rearward of the second heel-placement portion 23, operability of the accelerator 5 is not adversely affected due to an excessively increased height of the heel Kt of the tall person T. In addition, the heel-placement region for the tall person T is made up of the approximately horizontal floor portion 8. This makes it possible to allow the tall person T to readily recognize a heel-placement position for the heel Kt.

In case of the tall person T, the heel Kt of the operating-foot can be positioned rearward of a position between the brake pedal 4 and the accelerator pedal 5, i.e., rearward of the rear end of the first heel-placement portion 22, to switch between respective pedal-depressing positions for the accelerator pedal 5 and the brake pedal 4. This makes it possible to effectively prevent the occurrence of an undesirable situation where the switching of the pedal-depressing positions is hindered by the first and second heel-placement portions 22, 23.

Figure 25:
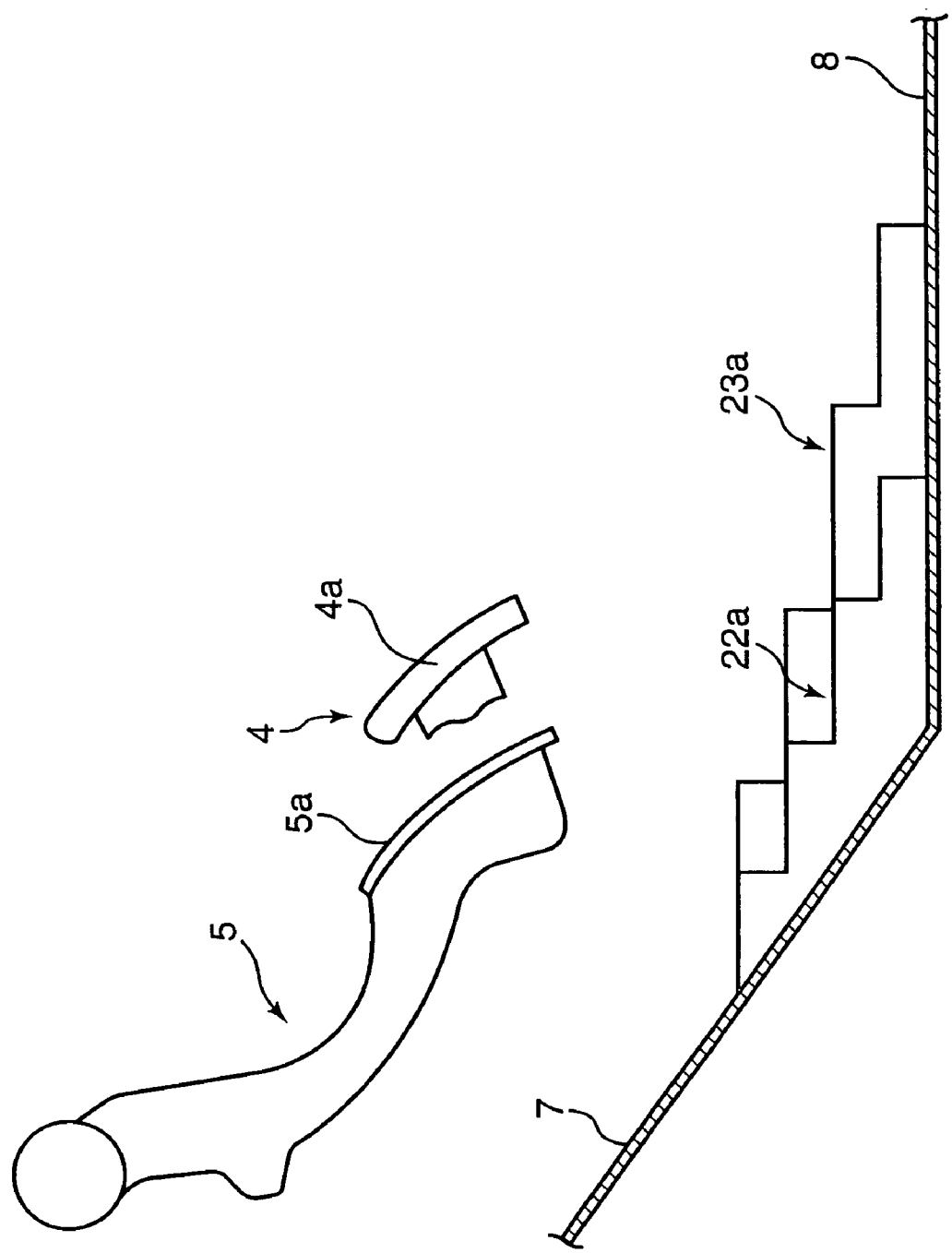
FIG. 25 is a sectional side view showing a modified example of the pad member in the vehicle driver-side floor structure according to the second embodiment, which corresponds to FIG. 20.

In place of the configuration in the third embodiment where each of the upper surfaces 25, 26 of the first and second heel-placement portions 22, 23 is formed to extend obliquely upwardly and frontwardly at a constant inclination angle, first and second heel-placement portions 22a, 23a each formed to have a step-like upper surface generally extending obliquely upwardly and frontwardly may be provided in the heel-placement zone, as shown in FIG. 25. However, in the configuration illustrated, for example, in FIG. 19 where each of the upper surfaces 25, 26 of the first and second heel-placement portions 22, 23 is formed to extend obliquely upwardly and frontwardly at a constant inclination angle, although a plurality of the short persons S have various sole sizes, the short person S seated in the driver seat 1 is move the heel Ks longitudinally depending on a size of his/her sole, so that a position of the ball region Bs of the sole can be finely adjusted in such a manner as to be accurately brought into contact with the depressing point $4a$ of the brake pedal 4 or the depressing point $5a$ of the accelerator pedal 5, while keeping each of the ankle angle $\theta 1$ and the sole inclination angle $\theta 7$ of an operating-foot at an adequate value.

Particularly, in the third embodiment, the first heel-placement portion 22 located rearward of the brake pedal 4 is formed such that an inclination angle $\gamma$ (gamma) of the upper surface 25 thereof with respect to a horizontal plane is set to be greater than an inclination angle $\beta$ of the upper surface 26 of the second heel-placement portion 23 located rearward of the accelerator pedal 5. This makes it possible to effectively reduce a frontward-rearward (i.e., longitudinal) dimension of the first heel-placement portion 22 while maintaining a height dimension of the first heel-placement portion 22. This provides an advantage of being able to prevent the occurrence of an undesirable situation where the first heel-placement portion 22 hinders a pedal-depressing operation for the accelerator pedal 5 or the brake pedal 4 by an operating-foot of a medium-height person whose heel may be placed on a position adjacent to the rear end of the first heel-placement portion 22. Further, in the case where the short person S operates the brake pedal 4, the heel Ks of the operating-foot can be placed on the first heel-placement portion 22 to allow the ball region Bs to be brought into contact with the depressing point 4a of the brake pedal 4 while keeping each of the ankle angle θ1 and the sole inclination angle θ7 of an operating-foot at an adequate value.

For example, the inclination angle of the upper surface 25 of the first heel-placement portion 22 is set in the range of 16 to 24 degrees with respect to the horizontal plane. In this case, the upper surface 25 of the first heel-placement portion 22 can be set at an adequate height position, and the longitudinal dimension of the first heel-placement portion 22 can be set such that the rear end of the first heel-placement portion 22 is positioned in a heel-placement region located slightly frontward of a heel-placement position for the average-height person M, so as to allow the short person S to adequately perform a pedal-depressing operation under a condition that the short person S places the heel on the first heel-placement portion 22. Further, the inclination angle of the upper surface of the second heel-placement portion is set in the range of 10 to 15 degrees with respect to the horizontal plane. This provides an advantage of being able to set a height position of the second heel-placement portion to allow each driver to adequately perform a pedal-depressing operation depending on a body size, and set a longitudinal dimension of the second heel-placement portion in such a manner as to allow the second heel-placement portion to be arranged over the overall length of a longitudinal region having a possibility that any driver seated on the driver seat places a heel of his/her operating-foot thereon.

Further, as shown in the third embodiment, the connection portion 24 is formed between the first heel-placement portion 22 located rearward of the brake pedal 4, and the second heel-placement portion 23 located rearward of the accelerator pedal 5, to smoothly connect the first and second heel-placement portions 22, 23. This provides an advantage of being able to allow the short person S who places the heel Ks of the operating-foot on the second heel-placement portion 23 during a normal driving, to smoothly switch from one pedal-depressing position for the accelerator pedal 5 to another pedal-depressing position for the brake pedal 4, while moving the heel along the connection portion.

An arc-shaped continuous connection portion may be provided in the rear end of the pad member 21 constituting the first and second heel-placement portions 22, 23, to smoothly connect the pad member 21 and the approximately horizontal surface portion (floor portion 8) located rearward of the rear end. However, in the configuration where each of the laterally-extending valley-shaped bent regions 27, 28 are formed between a corresponding one of the first and second heel-placement portions 22, 23, and the floor portion 8, as in the third embodiment, a driver seated in the driver seat 1 can recognize a boundary between the first and second heel-placement portions 22, 23, and the floor portion 8. This provides an advantage of being able to allow the driver to accurately figure out a heel-placement position for a heel of his/her operating foot, on the basis of the valley-shaped bent regions 27, 28.

Although the above embodiments have been described based on one example where the seat adjustment mechanism comprising the longitudinal-position adjustment mechanism 2 and the tilt-angle adjustment mechanism 3 is configured to automatically move the driver seat 1 frontwardly and rearwardly based on a switch operation by a driver, and reduce the rearward tilt angle of the seat cushion 1a of the driver seat 1 in conjunction with the forward movement of the driver seat 1, the seat adjustment mechanism may be configured to change the longitudinal position of the driver seat 1 and the rearward tilt angle of the seat cushion 1a according to a driver's manual operation.

In the above embodiment, the pad member 13 is fixed onto the floor portion 8 through an adhesive or a fastening bolt, in such a manner as to allow the inclined surface portion 14 and the sector-shaped portion 15 each having an upper surface (17, 18) extending obliquely upwardly and frontwardly, or the inclined surface portion including the first heel-placement portion 22 located rearward of the brake pedal 4 and the second heel-placement portion 23 located rearward of the accelerator pedal 5, to be formed in the heel-placement zone. Alternatively, the inclined member 14 may be formed in a driver-side floor mat material to be fixedly laid on the floor portion 8, or may be formed by raising a part of the floor portion 8 of the vehicle body 8, relative to other members.

In summary, according to a first aspect of the present invention, there is provided a floor structure on a driver side of a vehicle where a control pedal adapted to be depressedly operated by a driver seated in a driver seat is arranged at a front of a passenger compartment. The floor structure comprises a heel-placement zone which is provided on an approximately horizontal floor portion located rearward of a depressing point of the control pedal, and formed to have the heel-placement zone has a frontward region adapted to allow a short person seated in the driver seat to place his/her heel thereon and a rearward region adapted to allow a tall person seated in the driver seat to place his/her heel thereon, wherein the heel-placement zone includes an inclined surface portion formed in at least a part thereof in such a manner as to rise relative to a surrounding area of the floor portion and have an upper surface extending obliquely upwardly and frontwardly.

In the floor structure as mentioned above, according to the need, a driver seated in the diver seat can place his/her heel on the inclined surface portion and adjust a position of the heel to be placed on the inclined surface portion (heel-placement position) to allow a ball region of the driver to be brought into contact with the depressing point of the control pedal, while keeping each of an angle of an ankle region and an inclination angle of a sole of the driver, at an adequate value. This provides an advantage of being able to prevent the occurrence of difficulty in delicately perform a pedal-depressing operation, due to a situation where a heel of an operating-foot of the driver is spaced apart from a floor surface during the pedal-depressing operation, and further prevent the occurrence of difficulty in quickly operating the control pedal due to a situation where the angle of the ankle region or the inclination angle of the sole is largely deviated from the adequate value.

According to a second aspect of the invention, the upper surface of the inclined surface portion has an inclination angle set in the range of 13.5 to 23.5 degrees with respect to a horizontal plane. With this feature, it provides an advantage of being able to allow a ball region of the short person to be brought into contact with the depressing point of the control pedal under a condition that the short person places his/her heel on the inclined surface portion.

According to a third aspect of the invention, the inclined surface portion is formed only in the frontward region of the heel-placement zone. With this feature, it makes it possible to effectively prevent the occurrence of an undesirable situation where the heel of the short person is spaced apart from a floor surface to cause deterioration in pedal operability. Further, in the heel-placement zone, the rearward region adapted to allow a tall person seated in the driver seat to place his/her heel thereon may be made up of the approximately horizontal floor portion to allow the tall person to readily recognize that the rearward region is a heel-placement zone for him/her.

According to a fourth aspect of the invention, a rear end of the inclined surface portion, and an approximately horizontal surface portion located rearward of and continuous with the rear end, are formed to have therebetween a valley-shaped bent region extending in a lateral direction of the vehicle. With this feature, it makes it possible to allow an average-height person who may most frequently sit on the driver seat to readily recognize a heel-placement position for him/her, based the valley-shaped bent region.

According to a fifth aspect of the invention, the driver seat comprises a seat adjustment mechanism adapted to move the driver seat frontwardly and rearwardly, and reduce a rearward tilt angle of a seat cushion of the driver seat in conjunction with the forward movement of the driver seat. With this feature, a driver seated in the driver seat can manually operate each of the longitudinal-position adjustment mechanism and the tilt-angle adjustment mechanism, depending on a body height of the driver. This provides an advantage of being able to allow an eye point of the driver to lie on a proper line while maintain a seated posture of the driver, and automatically adjust the longitudinal position of the driver seat and the tilt angle of the seat cushion to obtain excellent steering-wheel operability and pedal operability.

According to a sixth aspect of the invention, the control pedal includes an accelerator pedal, wherein the inclined surface portion is formed in a region rearward of the accelerator pedal, and the heel-placement zone includes a sector-shaped portion formed to continuously extend from the inclined surface portion and have an upper surface with a same inclination angle as that of the inclined surface portion and an arc conical shape about a point on a vertical line extending through a rear portion of the accelerator pedal. With the aforementioned feature of the floor structure, it provides an advantage of being able to allow the short person to adequately operate each of the acceleration and brake pedals under a condition that the short person places his/her heel on a corresponding one of the inclined surface and sector-shaped portion, while preventing the inclined surface portion and the sector-shaped portion from hindering an action of the tall person for changing a pedal-depressing positions between the accelerator and the brake pedal.

According to a seventh aspect of the invention, each of a rear end of the inclined surface portion and a peripheral end of the sector-shaped portion, and an approximately horizontal surface portion located rearward of and continuous with the rear end and the peripheral end, are formed to have therebetween a valley-shaped bent region extending in a lateral direction of the vehicle. With the aforementioned feature, a driver seated in the driver seat can recognize a boundary position between the inclined surface portion/sector-shaped portion and the approximately horizontal surface portion (floor portion). This provides an advantage of being able to allow the driver to accurately figure out a heel-placement position for him/her, on the basis of the valley-shaped bent region.

According to an eighth aspect of the invention, each of the upper surfaces of the inclined surface portion and the sector-shaped portion is colored with a different color from that of the approximately horizontal surface portion located rearward of and continuous with the upper surfaces. With the aforementioned feature of the floor structure, it provides an advantage of being able to allow a driver, particularly the short person, seated in the driver seat, to recognize a heel-placement position for him/her, more readily and accurately, based on the color given to the upper surfaces of the inclined surface portion and the sector-shaped portion.

According to a ninth aspect of the invention, the control pedal includes an accelerator pedal and a brake pedal, wherein the inclined surface portion is formed to extend in a lateral direction of the vehicle in a range from an installation area of the accelerator pedal to an installation area of the brake pedal. In this case, for example, when the short person seated in the driver seat switches between respective pedal-depressing positions for the accelerator pedal and the brake pedal, the short person can place a heel of his/her operating-foot on the inclined surface portion and slidingly move the heel along the inclined surface portion to perform the switching of the pedal-depressing positions adequately and smoothly.

According to a tenth aspect of the invention, the heel-placement zone includes a sector-shaped portion formed on a left side of the inclined surface portion to continuously extend from the inclined surface portion and have an upper surface with a same inclination angle as that of the inclined surface portion and an arc conical shape about a point on a vertical line extending through the depressing point of the brake pedal. With the aforementioned feature, the structure provides an advantage of being able to, for example, when the short person seated on the driver seat operates the brake pedal by his/her left foot, operate the brake pedal, while placing the heel on the sector-shaped portion.

According to an eleventh aspect of the invention, the control pedal includes a brake pedal and an accelerator pedal on a right side of the brake pedal, wherein the inclined surface portion comprises a first heel-placement portion located rearward of the brake pedal, and a second heel-placement portion located rearward of the accelerator pedal, wherein the first heel-placement portion has a frontward-rearward dimension set to be less than that of the second heel-placement portion. In the aforementioned floor structure, under a condition that the short person seated in the driver seat places a heel of his/her operating-foot on the first heel-placement portion, the short person can bring a ball region of the operating-foot into contact with a depressing point of the accelerator pedal while keeping each of an angle of an ankle region and an inclination angle of a sole of the operating-foot at an adequate angle. This provides an advantage of being able to prevent the occurrence of difficulty in delicately performing a pedal-depressing operation, particularly for the accelerator pedal, due to a situation where a heel of the operating-foot is spaced apart from a floor surface during the pedal-depressing operation, and further prevent the occurrence of difficulty in quickly depressing the accelerator pedal due to a situation where the angle of the ankle region or the inclination angle of the sole is largely deviated from the adequate value. Further, in case of the tall person, respective operations of depressing the accelerator pedal and the brake pedal can be performed under a condition that a heel of an operating-foot of the tall person is located at a position rearward of a rear end of the first heel-placement portion and on a lateral side of the second heel-placement portion. This provide an advantage of being able to effectively prevent the occurrence of an undesirable situation where the switching between respective pedal-depressing positions for the accelerator pedal and the brake pedal is hindered by the first and second heel-placement portions.

According to a 12th aspect of the invention, the first heel-placement portion located rearward of the brake pedal has an upper surface with an inclination angle with respect to a horizontal plane which is set to be greater than that of an upper surface of the second heel-placement portion located rearward of the accelerator pedal. With the aforementioned feature, the structure provides an advantages of being able to prevent the presence of the first heel-placement portion from hindering an operation of depressing the acceleration pedal or the brake pedal by a medium-height person who has a possibility to place a heel of his/her operating-foot at a position adjacent to the rear end of the first heel-placement portion. In addition, when the short person operates the brake pedal, the short person can place a heel of his/her operating-foot on the first heel-placement portion to allow a ball region of the operating-foot to be brought into contact with a depressing point of the brake pedal while keeping each of an angle of an ankle region and an inclination angle of a sole of the operating-foot at an adequate value.

According to a 13th aspect of the invention, the inclination angle of the upper surface of the first heel-placement portion is set in the range of 16 to 24 degrees with respect to the horizontal plane, and the inclination angle of the upper surface of the second heel-placement portion is set in the range of 10 to 15 degrees with respect to the horizontal plane. In the aforementioned floor structure, the inclination angle of the upper surface of the first heel-placement portion is set in the range of 16 to 24 degrees with respect to the horizontal plane. This makes it possible to set a height position of the first heel-placement portion at a value suitable for a pedal-depressing operation, and set a frontward-rearward (longitudinal) dimension of the first heel-placement portion in such a manner as to allow a rear end of the first heel-placement portion to be arranged in a heel-placement position slightly frontward of a heel-placement position for an average-height person. Further, the inclination angle of the upper surface of the second heel-placement portion is set in the range of 10 to 15 degrees with respect to the horizontal plane. This provides an advantage of being able to set a height position of the second heel-placement portion at a value suitable for a pedal-depressing operation, and set a frontward-rearward dimension of the second heel-placement portion in such a manner as to allow the second heel-placement portion to be arranged over the overall length of a frontward-rearward region having a possibility that any driver seated on the driver seat places a heel of his/her operating-foot thereon.

According to a 14th aspect of the invention, the heel-placement zone includes a connection portion formed between the first heel-placement portion located rearward of the brake pedal, and the second heel-placement portion located rearward of the accelerator pedal, to smoothly connect the first and second heel-placement portions. In the floor structure as mentioned above, the structure provides an advantage of being able to allow the short person who places the heel of the operating-foot on the second heel-placement portion during a normal driving, to smoothly switch from one pedal-depressing position for the accelerator pedal to another pedal-depressing position for the brake pedal, while moving the heel along the connection portion.

According to a 15th aspect of the invention, there is provided a floor structure on a driver side of a vehicle where a control pedal adapted to be depressedly operated by a driver seated in a driver seat is arranged at a front of a passenger compartment. The floor structure comprises a heel-placement zone which is provided on an approximately horizontal floor portion located rearward of a depressing point of the control pedal, and formed to have a frontward region adapted to allow a short person seated in the driver seat to place his/her heel thereon and a rearward region adapted to allow a tall person seated in the driver seat to place his/her heel thereon, wherein the control pedal includes an accelerator pedal and a brake pedal, and wherein the heel-placement zone includes an inclined surface portion formed only in the frontward region thereof in such a manner as to rise relative to a surrounding area of the floor portion and have an upper surface which extends obliquely upwardly and frontwardly and extends in a lateral direction of the vehicle in a range from an installation area of the accelerator pedal to an installation area of the brake pedal. The upper surface of the inclined surface portion has an inclination angle set in the range of 13.5 to 23.5 degrees with respect to a horizontal plane.

In the aforementioned floor structure, according to the need, the short person can place his/her heel on the inclined surface portion, and adjust a heel-placement position on the inclined surface portion depending on a body size of the short person. This provides an advantage of being able to allow a ball region of the short person to be brought into contact with a depressing point of each of the accelerator pedal and the brake pedal, while preventing the heel from slidingly falling down rearwardly according to a reaction force during a pedal-depressing operation, and keeping an angle of an ankle region and an incarnation angle of a sole of the short person, so as to adequately operate each of the accelerator pedal and the brake pedal, and allow the short person to slidingly move the heel along the inclined surface so as to switch between respective pedal-depressing positions for the accelerator pedal and the brake pedal, readily and adequately, while keeping each of the angle of the ankle region and the incarnation angle of the sole at an adequate value.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A floor structure on a driver side of a vehicle where a control pedal adapted to be depressedly operated by a driver seated in a driver seat is arranged at a front of a passenger compartment, the floor structure comprising:
   a heel-placement zone which is provided on an approximately horizontal floor portion located rearward of a depressing point of the control pedal, said heel-placement zone including:
   a frontward region adapted to allow a short person seated in the driver seat to place his/her heel thereon and
   a rearward region adapted to allow a tall person seated in the driver seat to place his/her heel thereon,
   wherein the heel-placement zone including an inclined surface portion formed in at least part thereof in such a manner as to rise relative to a surrounding area of the floor portion and have an upper surface extending obliquely upwardly and frontwardly.

2. The floor structure as defined in claim 1, wherein the upper surface of the inclined surface portion has an inclination angle set in the range of 13.5 to 23.5 degrees with respect to a horizontal plane.

3. The floor structure as defined in claim 2, wherein the inclined surface portion is formed only in the frontward region of the heel-placement zone.

4. The floor structure as defined in claim 3, wherein a rear end of the inclined surface portion, and an approximately horizontal surface portion located rearward of and continuous with the rear end, are formed to have therebetween a valley-shaped bent region extending in a lateral direction of the vehicle.

5. The floor structure as defined in claim 2, which the driver seat includes a seat adjustment mechanism adapted to move the driver seat frontwardly and rearwardly, and reduce a rearward tilt angle of a seat cushion of the driver seat in conjunction with the forward movement of the driver seat.

6. The floor structure as defined in claim 1, wherein the control pedal includes an accelerator pedal, wherein:
   the inclined surface portion is formed in a region rearward of the accelerator pedal; and
   the heel-placement zone further includes a sector-shaped portion formed continuously from said inclined surface portion and have an upper surface with a same inclination angle as that of said inclined surface portion and an arc conical shape about a point on a vertical line extending a rear portion of a depressing point of the accelerator pedal.

7. The floor structure as defined in claim 6, wherein each of a rear end of the inclined surface portion and a peripheral end of the sector-shaped portion, and an approximately horizontal surface portion located rearward of and continuous with the rear end and the peripheral end, are formed to have therebetween a valley-shaped bent region extending in a lateral direction of the vehicle.

8. The floor structure as defined in claim 7, wherein each of the upper surfaces of the inclined surface portion and the sector-shaped portion is given a different color from that of the approximately horizontal surface portion located rearward of and continuous with the upper surfaces.

9. The floor structure as defined in claim 2, wherein the control pedal includes an accelerator pedal and a brake pedal, wherein the inclined surface portion is formed to extend in a lateral direction of the vehicle in a range from an installation area of the accelerator pedal to an installation area of the brake pedal.

10. The floor structure as defined in claim 9, wherein the heel-placement zone includes a sector-shaped portion formed on a left side of the inclined surface portion to continuously extend from the inclined surface portion and have an upper surface with a same inclination angle as that of the inclined surface portion and an arc conical shape about a point on a vertical line extending through a depressing point of the brake pedal.

11. The floor structure as defined in claim 1, wherein the control pedal includes a brake pedal and an accelerator pedal on a right side of the brake pedal, wherein the inclined surface portion comprises a first heel-placement portion located rearward of the brake pedal, and a second heel-placement portion located rearward of the accelerator pedal, the first heel-placement portion having a frontward-rearward dimension set to be shorter than that of the second heel-placement portion.

12. The floor structure as defined in claim 11, wherein the first heel-placement portion located rearward of the brake pedal has an upper surface with an inclination angle with respect to a horizontal plane which is set to be greater than that of an upper surface of the second heel-placement portion located rearward of the accelerator pedal.

13. The floor structure as defined in claim 12, wherein:
   the inclination angle of the upper surface of the first heel-placement portion is set in the range of 16 to 24 degrees with respect to the horizontal plane; and
   the inclination angle of the upper surface of the second heel-placement portion is set in the range of 10 to 15 degrees with respect to the horizontal plane.

14. The floor structure as defined in claim 12, wherein the heel-placement zone includes a connection portion formed between the first heel-placement portion located rearward of the brake pedal, and the second heel-placement portion located rearward of the accelerator pedal, to smoothly connect the first and second heel-placement portions.

15. A floor structure on a driver side of a vehicle where a control pedal adapted to be depressedly operated by a driver seated in a driver seat is arranged at a front of a passenger compartment, the floor structure comprising:
   a heel-placement zone which is provided on an approximately horizontal floor portion located rearward of a depressing point of the control pedal, and formed to have a frontward region adapted to allow a short person seated in the driver seat to place his/her heel thereon and
   a rearward region adapted to allow a tall person seated in the driver seat to place his/her heel thereon,
   wherein the control pedal includes an accelerator pedal and a brake pedal, and
   wherein the heel-placement zone includes an inclined surface portion formed only in the frontward region thereof in such a manner as to rise relative to a surrounding area of the floor portion and have an upper surface which extends obliquely upwardly and frontwardly and extends in a lateral direction of the vehicle in a range from an installation area of the accelerator pedal to an installation area of the brake pedal, the upper surface of the inclined surface portion having an inclination angle set in the range of 13.5 to 23.5 degrees with respect to a horizontal plane.

* * * * *